US012315378B2

(12) United States Patent
Casey et al.

(10) Patent No.: US 12,315,378 B2
(45) Date of Patent: May 27, 2025

(54) SYSTEMS AND METHODS FOR FLIGHT PLAN SPECIFIC DISTRIBUTED LEDGER BASED AVIATION DATA LINK SECURITY

(71) Applicant: Aura Network Systems, Inc., McLean, VA (US)

(72) Inventors: Tamara Lynne Casey, Annapolis, MD (US); Michael Robert Gagne, Monrovia, MD (US); Bryan Wesley Brown, Baltimore, MD (US); Christopher David Coleman, Arlington, VA (US); Allan Thomson, Pleasanton, CA (US)

(73) Assignee: AURA Network Systems, Inc., McLean, VA (US)

( * ) Notice: Subject to any disclaimer, the term of this patent is extended or adjusted under 35 U.S.C. 154(b) by 200 days.

(21) Appl. No.: 17/829,887

(22) Filed: Jun. 1, 2022

(65) Prior Publication Data

US 2022/0383760 A1    Dec. 1, 2022

Related U.S. Application Data

(60) Provisional application No. 63/252,885, filed on Oct. 6, 2021, provisional application No. 63/195,433, filed on Jun. 1, 2021.

(51) Int. Cl.
*G08G 5/34* (2025.01)
*G08G 5/26* (2025.01)
(Continued)

(52) U.S. Cl.
CPC .............. *G08G 5/34* (2025.01); *G08G 5/26* (2025.01); *H04L 9/3239* (2013.01); *H04L 9/50* (2022.05);
(Continued)

(58) Field of Classification Search
CPC ....... H04L 9/3239; H04L 45/121; H04L 9/50; G08G 5/0013; G08G 5/00; G08G 5/0039;
(Continued)

(56) References Cited

U.S. PATENT DOCUMENTS

| 4,347,513 A | 8/1982 | Schindler |
| 6,018,659 A | 1/2000 | Ayyagari et al. |

(Continued)

FOREIGN PATENT DOCUMENTS

| CA | 2189494 A1 | 5/1997 |
| CN | 108173590 A | 6/2018 |

(Continued)

OTHER PUBLICATIONS

Casey et al., U.S. Office Action mailed Mar. 3, 2023, directed to U.S. Appl. No. 17/569,379; 21 pages.
(Continued)

*Primary Examiner* — Yuri Kan
(74) *Attorney, Agent, or Firm* — Kubota & Basol LLP

(57) ABSTRACT

Presented herein are systems and methods for operating a flight plan based distributed ledger system implemented on an aviation communications network. According to an aspect, data associated with communication transmissions occurring between communications elements of the aviation communications network may be recorded on the distributed ledger system. The communications elements involved in the distributed ledger system may be determined using a received flight plan. The flight plan information may be used to initialize the ledger information at each communications element involved in the distributed ledger system. The distributed ledger system may be updated to add or remove communications elements if the flight deviates from the original flight plan. After the flight plan is executed, the
(Continued)

distributed ledger system may inactivate the ledger and store the ledger information in a centralized repository.

51 Claims, 10 Drawing Sheets

(51) Int. Cl.
    *H04L 9/00*          (2022.01)
    *H04L 9/32*          (2006.01)

(52) U.S. Cl.
    CPC ...... *H04L 2209/80* (2013.01); *H04L 2209/84* (2013.01)

(58) Field of Classification Search
    CPC ..... H04W 12/069; G06Q 10/20; B64C 13/16; G06F 21/64; G06F 16/2365; G06G 16/489; G05B 19/4185
    See application file for complete search history.

(56) References Cited

U.S. PATENT DOCUMENTS

| | | | |
|---|---|---|---|
| 6,163,681 | A | 12/2000 | Wright et al. |
| 6,167,239 | A | 12/2000 | Wright et al. |
| 6,944,475 | B1 | 9/2005 | Campbell |
| 8,615,263 | B2 | 12/2013 | Madon et al. |
| 8,897,770 | B1 | 11/2014 | Frolov et al. |
| 8,914,022 | B2 | 12/2014 | Kostanic et al. |
| 9,185,603 | B1 | 11/2015 | McCarthy |
| 9,319,172 | B2 | 4/2016 | Jalali et al. |
| 9,596,053 | B1 | 3/2017 | Marupaduga et al. |
| 9,734,723 | B1 | 8/2017 | Bruno et al. |
| 10,202,190 | B2 * | 2/2019 | Tao ...................... G08G 5/0013 |
| 10,205,508 | B1 | 2/2019 | Lindsley et al. |
| 10,304,343 | B2 | 5/2019 | Mustafic et al. |
| 10,354,536 | B1 | 7/2019 | Hegranes et al. |
| 10,372,122 | B2 | 8/2019 | Zach |
| 10,531,505 | B2 | 1/2020 | Gagne |
| 10,880,070 | B1 * | 12/2020 | Delaney .................. G06F 21/64 |
| 11,603,200 | B2 | 3/2023 | Bruhn |
| 11,804,141 | B2 | 10/2023 | Chase et al. |
| 2001/0052875 | A1 | 12/2001 | Kohno et al. |
| 2005/0108374 | A1 | 5/2005 | Pierzga et al. |
| 2007/0072560 | A1 | 3/2007 | Ishikawa |
| 2008/0274734 | A1 | 11/2008 | Kostanic et al. |
| 2010/0234024 | A1 | 9/2010 | Mcguffin |
| 2011/0116373 | A1 | 5/2011 | Lauer |
| 2011/0257874 | A1 | 10/2011 | Judd et al. |
| 2012/0270531 | A1 | 10/2012 | Wright et al. |
| 2012/0282962 | A1 | 11/2012 | Madon et al. |
| 2014/0024365 | A1 | 1/2014 | Mitchell |
| 2014/0274103 | A1 | 9/2014 | Steer et al. |
| 2015/0139073 | A1 | 5/2015 | Buchwald et al. |
| 2016/0119938 | A1 | 4/2016 | Frerking et al. |
| 2016/0275801 | A1 | 9/2016 | Kopardekar |
| 2017/0059688 | A1 | 3/2017 | Gan |
| 2017/0111271 | A1 * | 4/2017 | Thubert ................ H04L 45/121 |
| 2017/0215178 | A1 | 7/2017 | Kim et al. |
| 2017/0278410 | A1 | 9/2017 | Byers et al. |
| 2017/0293307 | A1 * | 10/2017 | Frolov .................... B64C 13/16 |
| 2018/0061251 | A1 | 3/2018 | Venkatraman et al. |
| 2018/0113206 | A1 | 4/2018 | Pokrass et al. |
| 2018/0164441 | A1 | 6/2018 | Feria et al. |
| 2018/0189312 | A1 * | 7/2018 | Alas ...................... H04L 9/3239 |
| 2018/0231655 | A1 | 8/2018 | Stark et al. |
| 2018/0324881 | A1 | 11/2018 | Gagne |
| 2018/0375568 | A1 | 12/2018 | De Rosa et al. |
| 2019/0012923 | A1 | 1/2019 | Weisbrod et al. |
| 2019/0041835 | A1 * | 2/2019 | Cella .................. G05B 19/4185 |
| 2019/0260462 | A1 | 8/2019 | Axmon et al. |
| 2019/0306675 | A1 | 10/2019 | Xue et al. |
| 2019/0331800 | A1 | 10/2019 | Espeland et al. |
| 2020/0043351 | A1 | 2/2020 | Hunter |
| 2020/0104294 | A1 * | 4/2020 | Alas ..................... G06F 16/2365 |
| 2020/0154426 | A1 | 5/2020 | Takács et al. |
| 2020/0184739 | A1 * | 6/2020 | Nathan ................. G06Q 10/20 |
| 2020/0258405 | A1 | 8/2020 | Fern et al. |
| 2020/0266903 | A1 | 8/2020 | De Rosa et al. |
| 2020/0372808 | A1 * | 11/2020 | Carraway ........... H04W 12/069 |
| 2021/0035457 | A1 * | 2/2021 | Pennapareddy ..... G08G 5/0013 |
| 2021/0118312 | A1 | 4/2021 | TakÁcs |
| 2021/0241632 | A1 | 8/2021 | Mustafic et al. |
| 2021/0282129 | A1 | 9/2021 | Kim et al. |
| 2022/0166525 | A1 | 5/2022 | De Rosa et al. |
| 2022/0217706 | A1 | 7/2022 | Casey et al. |
| 2022/0302968 | A1 | 9/2022 | Casey et al. |
| 2023/0208506 | A1 | 6/2023 | Ji et al. |
| 2023/0245571 | A1 | 8/2023 | Casey et al. |
| 2024/0089741 | A1 | 3/2024 | Tarraf et al. |
| 2024/0224309 | A1 | 7/2024 | Casey et al. |

FOREIGN PATENT DOCUMENTS

| | | | | |
|---|---|---|---|---|
| CN | 109450515 | A | 3/2019 | |
| CN | 112116830 | A | 12/2020 | |
| EP | 1485729 | B1 | 5/2008 | |
| EP | 1975822 | A1 * | 10/2008 | ........ G06F 17/30011 |
| KR | 1788721 | B1 | 10/2017 | |
| WO | 2007/020475 | A1 | 2/2007 | |
| WO | 2016/030656 | A1 | 3/2016 | |
| WO | 2018/178750 | A1 | 10/2018 | |
| WO | WO-2019086821 | A1 * | 5/2019 | ............... G08G 5/00 |
| WO | 2020/113062 | A1 | 6/2020 | |
| WO | 2020/263393 | A9 | 2/2021 | |
| WO | 2022/217530 | A1 | 10/2022 | |
| WO | 2023/049588 | A1 | 3/2023 | |
| WO | 2023/194013 | A1 | 10/2023 | |

OTHER PUBLICATIONS

International Search Report and Written Opinion mailed Apr. 19, 2022, directed to International Application No. PCT/US2022/070050; 12 pages.
International Search Report and Written Opinion mailed Sep. 21, 2022, directed to International Application No. PCT/US2022/072699; 19 pages.
Wang et al. (May 2021). "Blockchain enabled verification for cellular-connected unmanned aircraft system networking", Future Generation Computer Systems 123: 233-244.
Final Office Action received for U.S. Appl. No. 17/580,292, mailed on Feb. 2, 2023, 25 pages.
Final Office Action received for U.S. Appl. No. 17/569,379, mailed on Jul. 26, 2023, 22 pages.
International Search Report received for PCT Patent Application No. PCT/US2022/070272, mailed on Apr. 22, 2022, 5 pages.
International Search Report received for PCT Patent Application No. PCT/US2023/060402, mailed on Mar. 21, 2023, 5 pages.
International Search Report received for PCT Patent Application No. PCT/US2023/069999, mailed on Oct. 31, 2023, 5 pages.
Non-Final Office Action received for U.S. Appl. No. 17/580,292, mailed on Jun. 26, 2023, 26 pages.
Non-Final Office Action received for U.S. Appl. No. 17/580,292, mailed on Oct. 3, 2022, 24 pages.
Notice of Allowance received for U.S. Appl. No. 17/569,379, mailed on Dec. 19, 2023, 11 pages.
Notice of Allowance received for U.S. Appl. No. 17/580,292, mailed on Nov. 8, 2023, 8 pages.
Apaza et al., "A New Spectrum Management Concept For Future NAS Communications", 2020 AIAA/IEEE 39th Digital Avionics Systems Conference (DASC), San Antonio, TX, USA, 2020, pp. 1-7.
Jacob et al., "Cognitive Radio for Aeronautical Communications: A Survey", IEEE Access, vol. 4, May 19, 2016, pp. 3417-3443.
Jacob et al., "Efficient aviation spectrum management through dynamic frequency allocation", IEEE, 2015.
Knoblock et al., "Investigation and Evaluation of Advanced Spectrum Management Concepts for Aeronautical Communications", 2021 Integrated Communications Navigation and Surveillance Conference (ICNS), 2021, pp. 1-12.

(56) References Cited

OTHER PUBLICATIONS

Reyes et al., "A Cognitive Radio System for Improving the Reliability and Security of UAS/UAV Networks", IEEE, 2015.
Ribeiro et al., "A Framework for Dimensioning VDL-2 Air-ground Networks", 2014 Integrated Communications, Navigation and Surveillance Conference (ICNS) Conference Proceedings, Apr. 2014, pp. Q3-1-Q3-14.
International Search Report received for PCT Patent Application No. PCT/US2024/029807, mailed on Sep. 24, 2024, 6 pages.
Non-Final Office Action received for U.S. Appl. No. 18/152,608, mailed on Sep. 27, 2024, 14 pages.
Notice of Allowance received for U.S. Appl. No. 18/608,692, mailed on Oct. 7, 2024, 13 pages.
Kampichler, et al., Location Based Communication Services for UAS in the NAS, 2016 IEEE/AIAA 35th Digital Avionics Systems Conference (DASC), 2016, pp. 1-7.
Mulkerin, L-Band Commercial Communications Service for Unmanned Aircraft Systems, 2007 Integrated Communications, Navigation and Surveillance Conference, 2007, pp. 1-8.

\* cited by examiner

SYSTEMS AND METHODS FOR FLIGHT PLAN SPECIFIC DISTRIBUTED LEDGER BASED AVIATION DATA LINK SECURITY

RELATED APPLICATIONS

This application claims priority to U.S. Provisional Application No. 63/252,885, filed Oct. 6, 2021, and U.S. Provisional Application No. 63/195,433, filed Jun. 1, 2021, and is related to U.S. application Ser. No. 17/569,379, filed Jan. 5, 2022, the entire contents of each of which are incorporated herein by reference.

FIELD

This disclosure relates to securing data links in an aviation communications network, and more specifically, to systems and methods for maintaining distributed ledgers for the purpose of creating immutable records of communications and telemetry between airborne assets and a ground-based communications network.

BACKGROUND

For both manned and unmanned flights, the data link between airborne assets and the ground control systems is a critical resource that needs to be maintained throughout a flight. Airborne assets may relay operationally critical communications and transmit necessary information to the ground control system, and the airborne assets may also receive necessary information from the ground control system. In the example of unmanned aerial vehicles (UAVs), UAV operators and their control systems based on the ground must be in constant communication with the UAV not only to provide instructions to the UAV from the ground, but also to receive critical telemetry from the UAV that informs the ground-based control system and their operator about the UAV's operational status.

The data links between airborne assets and the ground control system need to meet the reliability, integrity and availability performance targets set forth by regulators. The security of this communication link should be impervious to outside threats. Additionally, information from the data link may need to be accessed and used by third parties due to regulatory or technical requirements. As such, records of the communications should be immutable to provide a legal chain of custody for its integrity where the immutability ensures the records of communications cannot be modified or tampered with. Aviation regulatory bodies often have stringent security standards and specifications for avionics equipment and data links. However, these standards typically suggest utilizing well known technologies, protocols and algorithms rather than specifying unique aspects of the aviation systems which in fact can lend themselves to furthering purpose built or optimized security solutions for aviation more broadly.

SUMMARY

According to an aspect, a terrestrial (i.e., ground) to air communications network can include a distributed ledger system that can be configured to operate in conjunction with a spectrum management system, operating as the ground control system, to create an immutable record of transmissions occurring between elements of one or more communications links established between an airborne radio and a ground-based control system operator during operation of the airborne radio as part of a flight.

In one or more examples, the distributed ledger system may include one or more aerial assets, such as manned aerial vehicles and/or UAVs that communicate with one or more base stations that are in communication with the aerial assets. In one or more examples, the network elements associated with the communication link (i.e., the base stations and other network elements) can implement a distributed ledger based recording system, that can record transmissions passed through the network associated with a specific flight plan operated in the network. In one or more examples, the distributed ledger system may include (in addition to the airborne radios and base stations) routers, switches, servers, and other network elements including one or more multi-access edge computing (MEC) systems and core data center (DC). In one or more examples, the MEC systems or core DC may include a monitoring and administration station to manage and view flight plans, conduct performance and reliability management, and/or manage and view flight plans.

In one or more examples, the distributed ledger system may include one or more network elements associated with each MEC systems, aerial station, pilot station, base station, and/or core DC. In one or more examples, the distributed ledger system may include one or more edge router nodes. In one or more examples, the edge router nodes may transmit data packets related to telemetry and/or control to a ledger node. In one or more examples, the distributed ledger system may include one or more radios at the base station, aerial station, and/or pilot station that can be configured to receive, modify, receive packets, and/or store data to a ledger node. In one or more examples, the data stored to a ledger node may include data from one or more packets.

In one or more examples, the distributed ledger may initialize the ledger information at each network element with flight plan information and may update the ledger information at each network element with flight information during the flight. In one or more examples, the distributed ledger system may be updated to add or remove network elements if the flight deviates from the original flight plan. In one or more examples, the distributed ledger system may inactivate the ledger and store the ledger information in a centralized repository.

According to an aspect, a method for operating a flight plan based distributed ledger system implemented on an aviation communications network, includes receiving a flight plan, wherein the received flight plan comprises timing, location, and altitude information for a flight that is to fly in one or more coverage areas of an aviation communications network; determining one or more communication elements of the aviation communications network associated with the received flight plan; initiating a distributed ledger system on the one or more communication elements determined to be associated with flight plan, wherein the distributed ledger comprises one or more nodes, and wherein each communication element of the one or more communication elements determined to be associated with the flight plan is configured to operate as a node in the distributed ledger system; recording data associated with one or more communication transmissions occurring between the one or more communications elements during the flight operating under the received flight plan on the distributed ledger system, wherein recording the data on the distributed ledger system comprises recording the data at each node of the distributed ledger system; determining when the flight operating under the flight plan has terminated; and when it is determined that the flight operating under the flight plan has terminated, transmitting the data recorded at each node of the distributed ledger system to a memory for storage.

Optionally, determining one or more communication elements of the aviation communications network associated with the received flight plan comprises determining which elements of the aviation communications network will be used to establish a communications link between a ground-based operator of the flight and an airborne radio associated with the flight plan during operation of the flight, based on the received flight plan.

Optionally, the one or more communication elements of the aviation communications network comprises one or more ground base stations.

Optionally, the one or more communication elements of the aviation communications network comprises one or more multi-access edge computing (MEC) systems.

Optionally, the one or more communication elements of the aviation communications network comprises one or more data centers.

Optionally, initiating a distributed ledger system on the one or more communication elements determined to be associated with flight plan comprises: transmitting the received flight plan to each communication element of the aviation communications network associated with the received flight plan; at each communication element of the aviation communications network, applying a cryptographic hash function to the received flight plan; and storing an output of the cryptographic hash function in a database located at each communication element of the aviation communications network associated with the received flight plan.

Optionally, the transmitted flight plan includes a list of the one or more communication elements associated with the received flight plan.

Optionally, initiating a distributed ledger system on the one or more communication elements determined to be associated with flight plan comprises: applying a consensus process on the output of the cryptographic hash function stored in each database of each communication element of the one or more communication elements determined to be associated with flight plan; determining if the output of the cryptographic hash function stored in each database of each communication elements are in agreement with each other; and if it is determined that the output of the cryptographic hash function stored in each database of each communication elements are in agreement with each other, authorizing data to be transmitted between the communication elements to establish a communications link between a ground based operator and an aerial radio associated with the received flight plan.

Optionally, recording data associated with one or more communication transmissions occurring between the one or more communications elements during the flight operating under the received flight plan on the distributed ledger system comprises: receiving a data transmission at a communications element of the one or more communications elements; appending a hash value to the received data transmission at the communications element; adding the received data transmission and the appended hash value to the database of the communications element; and transmitting the received data transmission and the appending hash value to the other communications elements of the one or more communications elements.

Optionally, the hash value appended to the received data transmission at the communications element is based on the direction of transmission of the received data through the communications network.

Optionally, the direction of transmission comprises transmissions from the ground based operator to the aerial radio.

Optionally, the direction of transmission comprises transmissions from the aerial radio to the ground based operator.

Optionally, the appended hash value comprises an output from an SHA1 function.

Optionally, the appended hash value comprises an output from an MD5 function;

Optionally, the SHA1 function output is appended for a first direction of transmission.

Optionally, the MD5 function output is appended for a second direction of transmission.

Optionally, the method comprises adding the transmitted data transmission to the database of each communications element of the other communications elements that received the transmitted data transmission.

Optionally, the method comprises, when it is determined that the flight operating under the flight plan has terminated, inactivating the distributed ledger system.

Optionally, the method comprises, once the distributed ledger system is inactivated, receiving the data recorded at each node and storing the received data in a memory.

Optionally, the method comprises: receiving an indication that the received flight plan has been modified; determining whether the one or more communication elements of the aviation communications network associated with the received flight plan has changed based on the received indication that the flight plan has been modified; and modifying the distributed ledger system to include one or new communications elements associated with the changed one or more communication elements.

Optionally, the method comprises applying a consensus process to the modified distributed ledger system.

Optionally, applying a consensus process comprises transmitting the data previously recorded at each node of the distributed ledger system associated with the originally received flight plan to one or more new communication elements associated with the modified flight plan.

According to an aspect, a system for operating a flight plan based distributed ledger system implemented on an aviation communications network, comprises: a memory; one or more processors; wherein the memory stores one or more programs that when executed by the one or more processors, cause the one or more processors to: receive a flight plan, wherein the received flight plan comprises timing, location, and altitude information for a flight that is to fly in one or more coverage areas of an aviation communications network; determine one or more communication elements of the aviation communications network associated with the received flight plan; initiate a distributed ledger system on the one or more communication elements determined to be associated with flight plan, wherein the distributed ledger comprises one or more nodes, and wherein each communication element of the one or more communication elements determined to be associated with the flight plan is configured to operate as a node in the distributed ledger system; record data associated with one or more communication transmissions occurring between the one or more communications elements during the flight operating under the received flight plan on the distributed ledger system, wherein recording the data on the distributed ledger system comprises recording the data at each node of the distributed ledger system; determine when the flight operating under the flight plan has terminated; and when it is determined that the flight operating under the flight plan has terminated, transmit the data recorded at each node of the distributed ledger system to a memory for storage.

Optionally, determining one or more communication elements of the aviation communications network associated with the received flight plan comprises determining which elements of the aviation communications network will be used to establish a communications link between a ground based operator of the flight and an airborne radio associated with the flight plan during operation of the flight, based on the received flight plan.

Optionally, the one or more communication elements of the aviation communications network comprises one or more ground base stations.

Optionally, the one or more communication elements of the aviation communications network comprises one or more multi-access edge computing (MEC) systems.

Optionally, the one or more communication elements of the aviation communications network comprises one or more data centers.

Optionally, initiating a distributed ledger system on the one or more communication elements determined to be associated with flight plan comprises: transmitting the received flight plan to each communication element of the aviation communications network associated with the received flight plan; at each communication element of the aviation communications network, applying a cryptographic hash function to the received flight plan; and storing an output of the cryptographic hash function in a database located at each communication element of the aviation communications network associated with the received flight plan.

Optionally, the transmitted flight plan includes a list of the one or more communication elements associated with the received flight plan.

Optionally, initiating a distributed ledger system on the one or more communication elements determined to be associated with flight plan comprises: applying a consensus process on the output of the cryptographic hash function stored in each database of each communication element of the one or more communication elements determined to be associated with flight plan; determining if the output of the cryptographic hash function stored in each database of each communication elements are in agreement with each other; and if it is determined that the output of the cryptographic hash function stored in each database of each communication elements are in agreement with each other, authorizing data to be transmitted between the communication elements to establish a communications link between a ground based operator and an aerial radio associated with the received flight plan.

Optionally, recording data associated with one or more communication transmissions occurring between the one or more communications elements during the flight operating under the received flight plan on the distributed ledger system comprises: receiving a data transmission at a communications element of the one or more communications elements; appending a hash value to the received data transmission at the communications element; adding the received data transmission and the appended hash value to the database of the communications element; and transmit the received data transmission and the appending has value to the other communications elements of the one or more communications elements.

Optionally, the hash value appended to the received data transmission at the communications element is based on the direction of transmission of the received data through the communications network.

Optionally, wherein the direction of transmission comprises transmissions from the ground based operator to the aerial radio.

Optionally, the direction of transmission comprises transmissions from the aerial radio to the ground based operator.

Optionally, the appended hash value comprises an output from an SHA1 function.

Optionally, the appended hash value comprises an output from an MD5 function;

Optionally, the SHA1 function output hash value is appended for a first direction of transmission.

Optionally, the MD5 function output hash value is appended for a second direction of transmission.

Optionally, the one or processors are caused to add the transmitted data transmission to the database of each communications element of the other communications elements that received the transmitted data transmission.

Optionally, the one or more processors are caused to, when it is determined that the flight operating under the flight plan has terminated, inactivate the distributed ledger system.

Optionally, the one or more processors are caused to, once the distributed ledger system is inactivated, receive the data recorded at each node and storing the received data in a centralized storage repository.

Optionally, the one or more processors are caused to: receive an indication that the received flight plan has been modified; determine whether the one or more communication elements of the aviation communications network associated with the received flight plan has changed based on the received indication that the flight plan has been modified; and modify the distributed ledger system to include one or new communications elements associated with the changed one or more communication elements.

Optionally, the one or more processors are caused to apply a consensus process to the modified distributed ledger system.

Optionally, applying a consensus process comprises transmitting the data previously recorded at each node of the distributed ledger system associated with the originally received flight plan to one or more new communication elements associated with the modified flight plan.

According to an aspect, a non-transitory computer readable storage medium storing one or more programs for operating a flight plan based distributed ledger system implemented on an aviation communications network, for execution by one or more processors of an electronic device that when executed by the device, cause the device to: receive a flight plan, wherein the received flight plan comprises timing, location, and altitude information for a flight that is to fly in one or more coverage areas of an aviation communications network; determine one or more communication elements of the aviation communications network associated with the received flight plan; initiate a distributed ledger system on the one or more communication elements determined to be associated with flight plan, wherein the distributed ledger comprises one or more nodes, and wherein each communication element of the one or more communication elements determined to be associated with the flight plan is configured to operate as a node in the distributed ledger system; record data associated with one or more communication transmissions occurring between the one or more communications elements during the flight operating under the received flight plan on the distributed ledger system, wherein recording the data on the distributed ledger system comprises recording the data at each node of the distributed ledger system; determine when the flight operating under the flight plan has terminated; and when it is determined that the flight operating under the flight plan has terminated, transmit the data recorded at each node of the distributed ledger system to a memory for storage.

Optionally, determining one or more communication elements of the aviation communications network associated with the received flight plan comprises determining which elements of the aviation communications network will be used to establish a communications link between a ground based operator of the flight and an airborne radio associated with the flight plan during operation of the flight, based on the received flight plan.

Optionally, the one or more communication elements of the aviation communications network comprises one or more ground base stations.

Optionally, the one or more communication elements of the aviation communications network comprises one or more multi-access edge computing (MEC) systems.

Optionally, the one or more communication elements of the aviation communications network comprises one or more data centers.

Optionally, initiating a distributed ledger system on the one or more communication elements determined to be associated with flight plan comprises: transmitting the received flight plan to each communication element of the aviation communications network associated with the received flight plan; at each communication element of the aviation communications network, applying a cryptographic hash function to the received flight plan; and storing an output of the cryptographic hash function in a database located at each communication element of the aviation communications network associated with the received flight plan.

Optionally, the transmitted flight plan includes a list of the one or more communication elements associated with the received flight plan.

Optionally, initiating a distributed ledger system on the one or more communication elements determined to be associated with flight plan comprises: applying a consensus process on the output of the cryptographic hash function stored in each database of each communication element of the one or more communication elements determined to be associated with flight plan; determining if the output of the cryptographic hash function stored in each database of each communication elements are in agreement with each other; and if it is determined that the output of the cryptographic hash function stored in each database of each communication elements are in agreement with each other, authorizing data to be transmitted between the communication elements to establish a communications link between a ground based operator and an aerial radio associated with the received flight plan.

Optionally, recording data associated with one or more communication transmissions occurring between the one or more communications elements during the flight operating under the received flight plan on the distributed ledger system comprises: receiving a data transmission at a communications element of the one or more communications elements; appending a hash value to the received data transmission at the communications element; adding the received data transmission and the appended hash value to the database of the communications element; and transmit the received data transmission and the appending has value to the other communications elements of the one or more communications elements.

Optionally, the hash value appended to the received data transmission at the communications element is based on the direction of transmission of the received data through the communications network.

Optionally, the direction of transmission comprises transmissions from the ground based operator to the aerial radio.

Optionally, the direction of transmission comprises transmissions from the aerial radio to the ground based operator.

Optionally, the appended hash value comprises an output of an SHA1 function.

Optionally, the appended hash value comprises an output of an MD5 function.

Optionally, the SHA1 function output hash value is appended for a first direction of transmission.

Optionally, the MD5 function output hash value is appended for a second direction of transmission.

Optionally, the one or processors are caused to add the transmitted data transmission to the database of each communications element of the other communications elements that received the transmitted data transmission.

Optionally, the one or more processors are caused to, when it is determined that the flight operating under the flight plan has terminated, inactivate the distributed ledger system.

Optionally, the one or more processors are caused to, once the distributed ledger system is inactivated, receive the data recorded at each node and storing the received data in a centralized storage repository.

Optionally, the device is caused to: receive an indication that the received flight plan has been modified; determine whether the one or more communication elements of the aviation communications network associated with the received flight plan has changed based on the received indication that the flight plan has been modified; and modify the distributed ledger system to include one or new communications elements associated with the changed one or more communication elements.

Optionally, the device is caused to apply a consensus process to the modified distributed ledger system.

Optionally, applying a consensus process comprises transmitting the data previously recorded at each node of the distributed ledger system associated with the originally received flight plan to one or more new communication elements associated with the modified flight plan.

BRIEF DESCRIPTION OF THE FIGURES

The invention will now be described, by way of example only, with reference to the accompanying drawings, in which.

DETAILED DESCRIPTION

Figure 1:
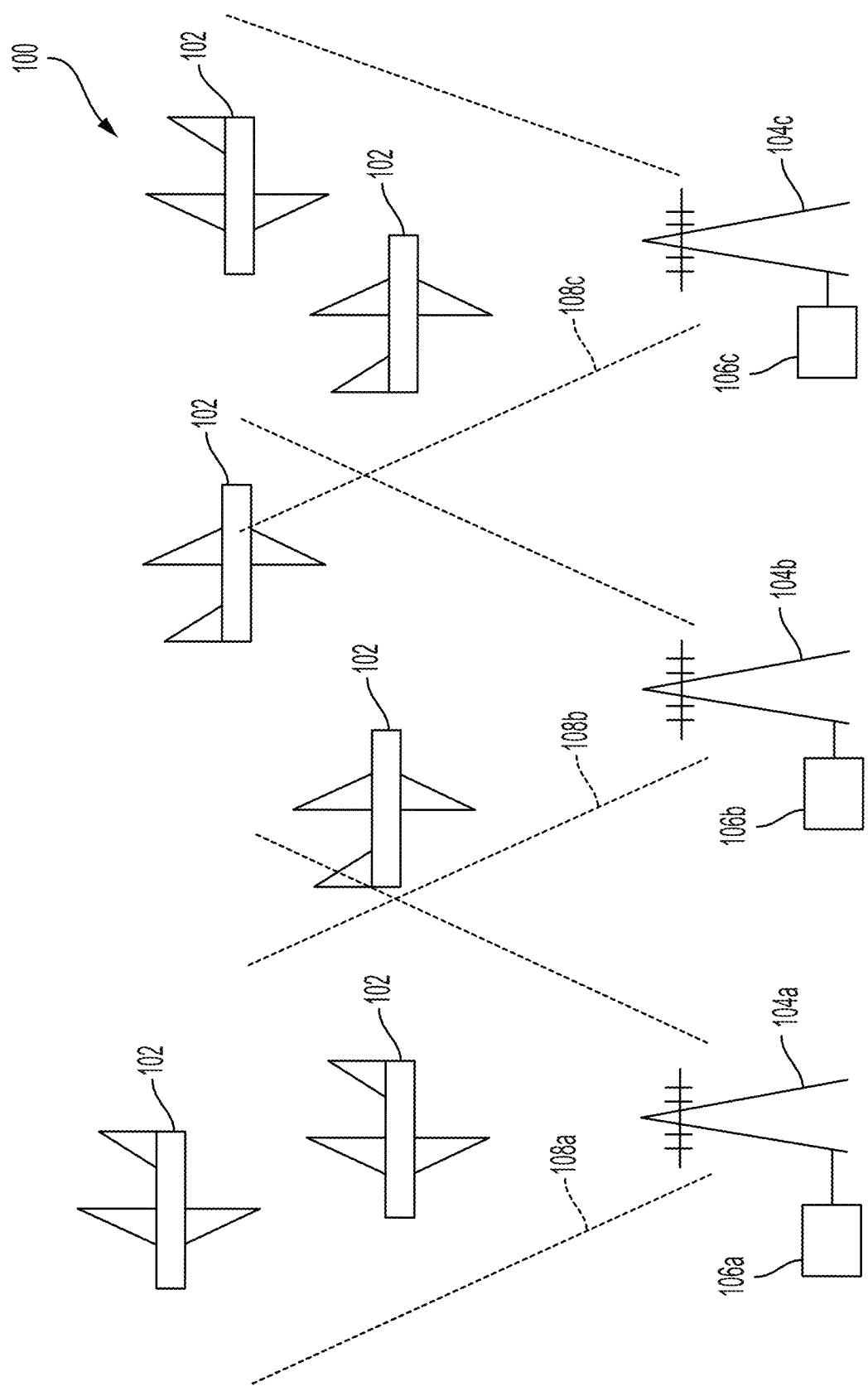
FIG. 1 illustrates an aviation communications network according to examples of the disclosure.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Described herein are systems and methods for implementing and maintaining a distributed ledger for communications and telemetry between airborne assets and a ground-based control system connected over a network. In one or more examples, the distributed ledger system may include one or more network elements at each aerial station, pilot station, MEC system, base station, and Core DC. In one or more examples, network elements may store data related to telemetry and/or control to a ledger associated with a network element. In one or more examples, the distributed ledger system may include one or more radios at the base station and/or on the airborne assets. In one or more examples, the one or more network element may receive and/or transmit packets. In one or more examples, the distributed ledger system may include a monitoring and administration station. In one or more examples, the monitoring and administration station may be able to manage and view flight plans, conduct performance and reliability management, and/or manage and view flight plans.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

FIG. 1 illustrates an aviation network according to examples of the disclosure. The example of FIG. 1 illustrates an exemplary communications network 100 that can be configured to provide communications between one or more ground base stations 104*a-c* and one or more aircraft 102 in-flight. Each of the ground base stations 104*a-c* include one or more antennas configured to transmit communications from the ground to the one or more aircraft 102. In one or more examples, each ground base station 104*a-c* can be configured to provide transmissions within a coverage area 108*a-c*. For example, ground base station 104*a* can be configured to transmit radio frequency (RF) spectrum radio signals over geographic coverage area 108*a*. Ground base station 104*b* can be configured to transmit RF spectrum radio signals over geographic coverage area 108*b*, and ground base station 104*c* can be configured to transmit RF spectrum radio signals over geographic coverage area 108*c*. In one or more examples, geographic coverage areas 108*a-c* can be three-dimensional areas that not only cover a certain range of latitude and longitude, but also provide coverage to areas from the ground up until a maximum serviceable altitude.

In one or more examples, each aircraft 102 can be handed over from one ground base station to the next during the duration of its flight. For instance, at the beginning of a flight, ground base station 104*a* can be responsible for providing a communications channel between an operator on the ground and the aircraft while the aircraft 102 is within the coverage area 108a. If during the flight, the aircraft transits out of the coverage area 108a into coverage area 108b, then responsibility for providing the communications channel can transition from ground base station 104a to ground station 104b. If during the flight, the aircraft 102 transits out of coverage area 108b into coverage area 108c, then responsibility for providing the communications channel can transition from ground base station 104b to ground station 104c. In this way, the communications network 100 can be configured to ensure that an aircraft has an established communications channel with at least one ground base station at any point along its flight plan, so long as the flight plan passes through at least one coverage area at any point during its flight.

In one or more examples, each base station 104a-c can be communicatively coupled to a base station controller 106a-c respectively. Thus, in one or more examples, ground base station 104a can be communicatively coupled to base station controller 106a, ground base station 104b can be communicatively coupled to base station controller 106b, and ground base station 104c can be communicatively coupled to base station controller 106c. As described in further detail below, each base station controller can be configured to implement an RF based communications channel between a ground operator and an aircraft 102 when the aircraft is transiting through the coverage area 108a-c that corresponds to the base station that the controller is configured to operate. In one or more examples, implementing an RF based communications channel can include modulating signals transmitted by the operator to a RF spectrum frequency assigned to the aircraft 102, applying an appropriate modulation scheme to the transmitted signals, and applying any other physical layer communications protocols such as error correction codes.

In one or more examples, the goal of the communications network 100 can be to provide any given aircraft 102 operating within the network with a continuous and reliable RF spectrum channel throughout the duration of its flight. In one or more examples, providing a continuous and reliable RF spectrum to an aircraft can include providing a single RF spectrum channel (i.e., slot) to an aircraft that it can reliably use throughout the duration of its flight to communicate with the ground. In one or more examples, each aircraft in a given airspace can communicate with the ground using a dedicated RF spectrum channel (i.e., a frequency range in the RF spectrum that is unique to the aircraft and can be only used by that individual aircraft to transmit and receive communications from the ground). In order to facilitate efficient flight operations, in one or more examples, each ground base station 104a-c coupled to its corresponding base station controller 106a-c can be configured to ensure that each aircraft in its coverage area 108a-c is able to communicate with the ground using communications transmitted in the RF spectrum channel assigned to that aircraft.

In one or more examples, each ground base station 104a-c can include one or more antennas that are mounted to the base station and are configured to transmit signals from one or more ground operators (i.e., pilots) to one or more airborne radios mounted on the aircraft 102. In one or more examples, and as described in further detail below, the one or more antennas can be implement as an array of computer-controlled antennas that can be electronically "steered" to point in different directions depending on the location of the aircraft in the network 100. In one or more examples, the antenna can be implemented as a phased array antenna, which allows for a signal to be directed in a particular direction without having to physically move the antennas. By pointing the antenna in the direction of the target (i.e., the airborne radio that will transmit to and receive data from the antenna), the antenna is able to maximize the signal to noise ratio of the communications link between the antenna and the airborne radio thereby ensuring a stable communications link between the ground and the airborne radio.

Figure 2:
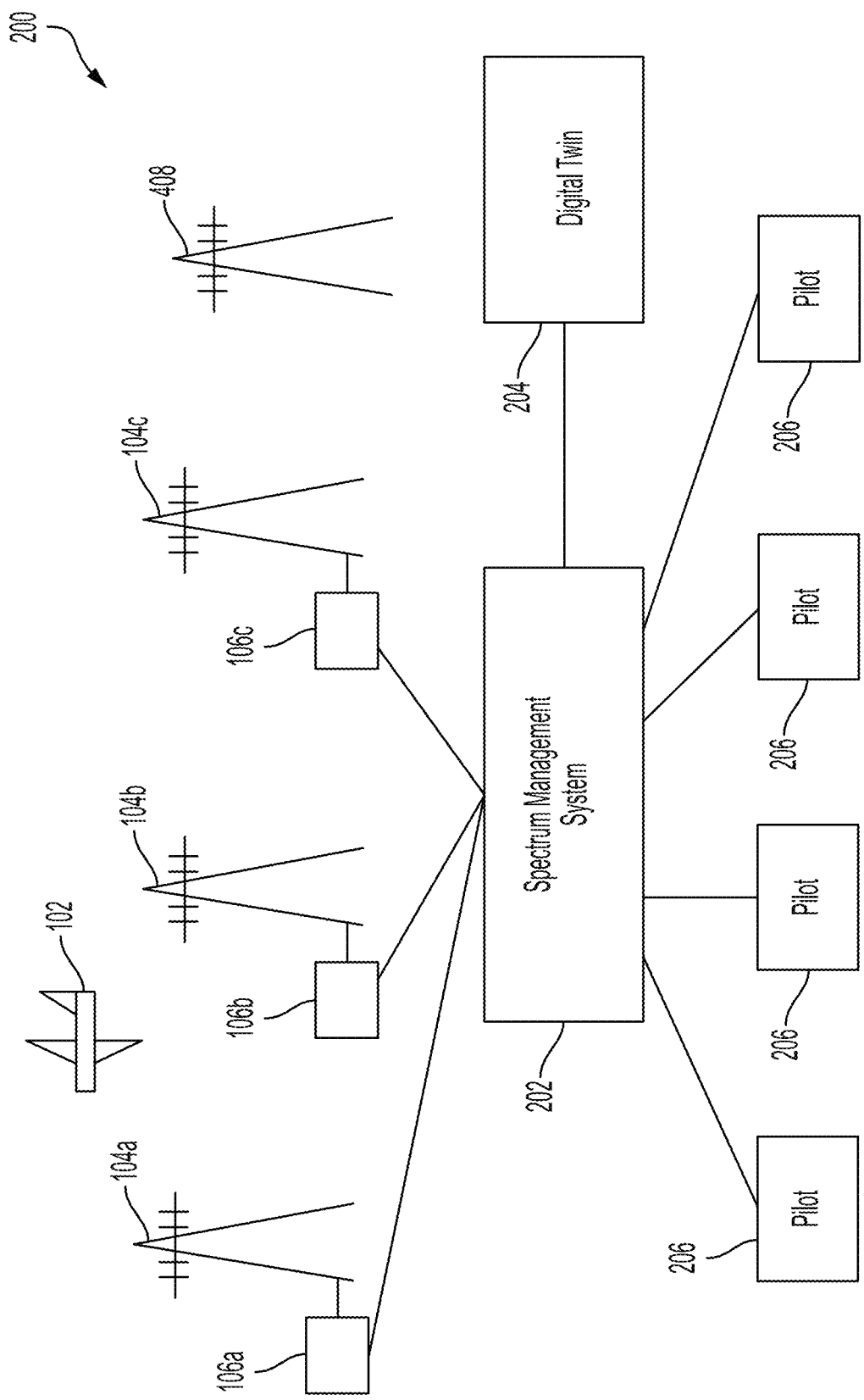
FIG. 2 illustrates an exemplary system for RF spectrum management of aviation communication networks according to examples of the disclosure.

FIG. 2 illustrates an exemplary system for RF spectrum management of aviation communication networks according to examples of the disclosure. In one or more examples of the disclosure, the communications network 200 of FIG. 2 can include the same components (i.e., aircraft 102, ground base stations 104a-c, and base station controller 106a-c) as the communications network 100 described above with respect to FIG. 1, but can also include one or more spectrum management system components (described in further detail below) that can manage the process of allocating RF spectrum channels to aircraft 102 in the network 200.

In one or more examples of the disclosure, one or more pilots/operators 206 can be connected to the network 200 in order to transmit data (such as command and control data) to the one or more aircraft 102. Each of the pilots 206 can be communicatively coupled to the network 200 through a spectrum management system 202 that can be configured to allocate RF spectrum channels to each of the aircraft 202 being controlled by the pilots 206. In one or more examples, the spectrum management system 202 can be configured to facilitate a communications link between each pilot 206 and their corresponding aircraft 102 by establishing an RF communications link using a specified RF spectrum channel allocated to each aircraft.

In one or more examples of the disclosure, the spectrum management system 202 can be configured to manage each active communication link between an aircraft 102 and a pilot/operator 206. Thus, in one or more examples, if the spectrum management system 202 determines that a given communications link has been compromised or had degraded, the spectrum management system 202 can take action to adjust the communications link to mitigate the issue. For instance, in one or more examples, if a given RF spectrum channel being used by an aircraft 102 is no longer performing satisfactorily or to required specifications, the spectrum channel management system 202 can change the RF spectrum channel (described in detail below) to an alternative available channel in real-time to ensure that each aircraft maintains a reliable RF communications link. In one or more examples, if the pilot deviates from their advertised flight plan (for example by flying longer than anticipated) the spectrum management system 202 can be configured to take action (for instance by switching the RF channel) to ensure that any interruptions to the communications channel are mitigated.

In one or more examples of the disclosure, in addition to actively managing communication channels, the spectrum management system 202 can be configured to allocate and reserve one or more RF channels for a given flight to be used during the duration of the flight. As described in further detail below, the spectrum management system 202 can receive a flight plan and based on the filed flight plan as well as other factors (such as the availability of the antenna) can allocate an RF channel to each flight in a deterministic manner that takes into account potential interference that may be encountered during the flight.

In one or more examples, the spectrum allocation process described above can be implemented by the spectrum management system 202, and/or can be processed in one or more separate components collectively referred to herein as a "digital twin." Due to the large volume of information and the potential for spectrum and/or traffic channel requests by tens of thousands of end users in a given airspace, a digital twin of the spectrum management system can be used to perform the required analysis without impacting the operational system. In one or more examples, and as illustrated in the example of FIG. 2, the digital twin 204 can be implemented separately from the spectrum management system 202 so as to reduce the processing load of the spectrum management system 202, thus leaving it free to perform the real-time operations associated with managing the active communications channels of aircraft transiting the airspace managed by the spectrum management system 202. Alternatively, the digital twin 204 can also be implemented as part of the spectrum management system such that both the real-time management of air communication links, and flight planning are performed by the same component.

In one or more examples, the digital twin 204 can be configured to receive one or more requests from the pilots 206 for spectrum to use during a given flight plan. The digital twin, using the flight plan provided by the pilot as well as other factors (described below) can determine what RF spectrum channels to allocate to an aircraft when its flight commences. Once requests are confirmed in the digital twin 204, execution and assignment of the communications channel on the operational spectrum management system 202 can be performed.

As described above, the spectrum management system 202 and the digital twin 204 can coordinate the RF spectrum needs of multiple aircraft in a given communications network so as to ensure that each individual aircraft can have access to a reliable and continuous communications channel with the ground during the entirety of its flight. In one or more examples, the spectrum management system 202 and the digital twin 204 can work in tandem to allocate and reserve RF spectrum channels for individual aircraft, and as described below, can monitor each individual communications link in-flight to ensure that the communications link is operating to its requirement.

Selecting an RF channel to allocate to a given flight can involve analyzing multiple variables to ensure that the selected channel will service the needs of an aircraft throughout the duration of its flight. In one or more examples, the spectrum management system 202 and the digital twin can analyze several variables such as the available spectrum resources, radio link throughput and performance requirements, location (including elevation), time-period as well as the radio frequency environment to assign a non-contended resource between the pilot and the aircraft. In one or more examples, the variables that influence channel selection can be populated by several internal and external components to the spectrum management system 202 that work together to match an aircraft to one or more RF channels for use during a flight as described below.

In one or more examples, each pilot (i.e., operator) in the communications network can interface with the communications network before and during their flight via the spectrum management system 202 and the digital twin 204. Before the flight, and as described below, the pilot can interface with the spectrum management system and digital twin to receive an RF spectrum channel allocation for use during their flight based on their filed flight plan and other variables. During the flight, the spectrum management system 202 can provision the allocated RF spectrum channel to both the aircraft and the pilot to establish a continuous communications link and the spectrum management system can monitor the link during the flight to make sure it is performing within specification.

In one or more examples of the disclosure, the network 200 can include one or more base stations that may or may not be connected such a point-to-point communication links to the spectrum management system 202. In one or more examples, a service provider who provides and maintains access to the spectrum management system 202 may not provide coverage to every desired geographic location. In one or more examples, in areas where a pilot may want to operate a flight but that does not fall within a coverage area of an existing base station, the service provider can provide the pilot with a temporary or portable base station 208. In one or more examples, the temporary/portable base station may not have a connection with the spectrum management system 202 and thus cannot receive/transmit information to the spectrum management system for the purposes of provisioning RF channels to aircraft. In one or more examples, these non-connected base stations will have operation plans submitted, into the spectrum management system and digital twin to be coordinated and geofenced for interference and coverage.

In one or more examples, the temporary/portable base station 208 can be used to setup point-to-point and multi-point links between the temporary/portable base station 208 and one or more aircrafts radios for flight operation. In one or more examples of the disclosure, the operator of a temporary/portable base station 208 can inform the service provider a "concept of operation" of the base station 208 that describes the number of aircraft, the times they will fly and the spectrum they will use to communicate with the aircraft. While the spectrum monitoring system 202 may not send real-time information to the temporary/portable base station 208, the spectrum management system 202 can use the concept of operation of the temporary/portable base station to update the geofences (described in detail below) of the base stations 106a-c that are connected to the network and can work to ensure that flights that are flying within its network 200 do not cause interference with the flight operations of the temporary/portable base station 208. In one or more examples, the spectrum management system 202 can notify the operators of flights transiting the network 200 about the physical limitations to their operations caused by the temporary/portable base station 208 and can factor in the operations of the temporary/portable base station 208 when making RF spectrum slot allocations. In this way, while the spectrum management system 202 may not coordinate the operations of the temporary/portable base station 208, it can work to protect its own network (i.e., the base stations that are connected to the spectrum management system) from the operations of the temporary/portable base station's point-to-point operations.

Figure 3:
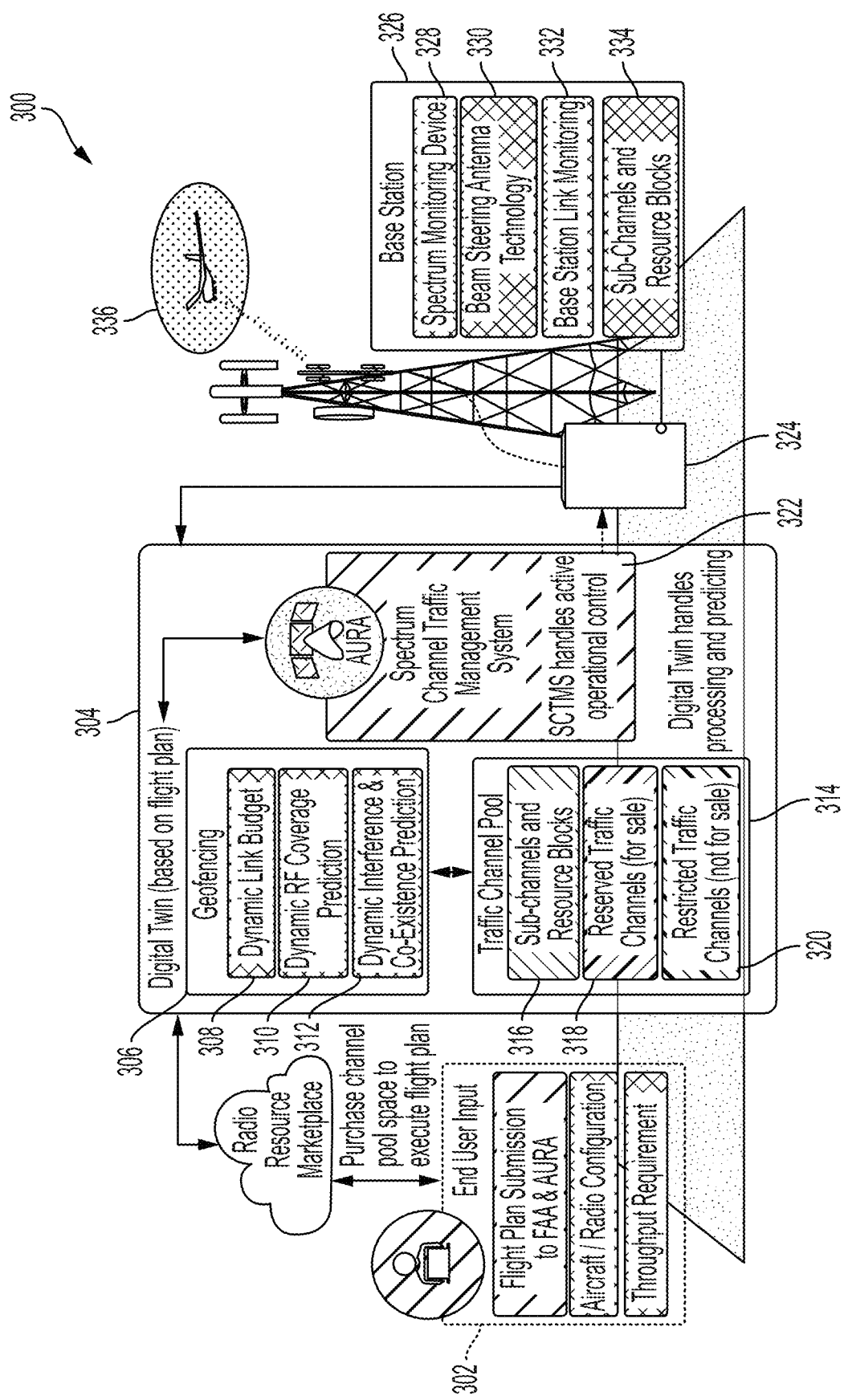
FIG. 3 illustrates an exemplary system for RF spectrum allocation and management according to examples of the disclosure.

FIG. 3 illustrates an exemplary system for RF spectrum allocation and management according to examples of the disclosure. In one or more examples, the system 300 can represent a single link of a communications network shown in FIGS. 1 and 2, and includes the components that manage the link between a pilot 302 and an aircraft 336. In one or more examples of the disclosure, the planning, creation, and operation of the link between the pilot 302 and the aircraft 336 can begin with the pilot 302 submitting information about their proposed flight to the digital twin 304. In one or more examples, and as shown in FIG. 3, the information transmitted by the pilot 302 to the digital twin 304 can include a flight plan, an aircraft/radio configuration, and a throughput requirement.

In one or more examples, the flight plan (which can also be referred to as an operations plan) submitted by the pilot 302 can include flight mission details such as the intended timing, altitude, location, and speed of the aircraft during a proposed flight. In one or more examples, the pilot 302 can submit the flight plan to both a regulatory body (such as the Federal Aviation Administration (FAA)) for approval and additionally send the flight plan to the spectrum management system via the digital twin 304 for the purpose of obtaining one or RF spectrum channels for use during the proposed flight. In addition to the flight plan, the pilot 302 can send additional information to the digital twin 304 that the digital twin can use to select and allocate a RF spectrum channel to the user. For instance, in one or more examples, the pilot 304 can transmit the configuration of the aircraft or radio so as to inform the digital twin 304 as to the type of radio that the pilot will be communicating with during the flight. Knowledge of the radio configuration can allow for the digital twin 304 to not only understand the spectrum needs of the aircraft but can also allow for the digital twin to determine and predict other necessary information about the communications channel such as the modulation scheme and the forward error correction code that will be active in-flight.

In one or more examples of the disclosure, the pilot 302 can also transmit a throughput requirement to the digital twin 304. In one or more examples, the throughput requirement can represent the amount of data that is needed to be sent and received over the communications link. In one or more examples, the throughput can either be specified by the pilot 302 or can be derived based on the aircraft/radio configuration submitted by the pilot. For instance, in one or more examples, a particular aircraft (such as a UAV) may need a certain throughput of data for the channel to properly operate its autopilot features and thus by knowing the aircraft type, the system can derive the throughput requirements for that flight. As described in detail below, the throughput requirement can be used to determine the total amount of bandwidth for an RF spectrum channel and can thus inform the selection of a channel or channels that has an effective bandwidth to accommodate the throughput requirements of the flight.

As described above, the digital twin 304 can use the flight plan and other information transmitted to it by the pilot 302 as well as other information to select one or more RF spectrum channels for use by the pilot 302 during their flight. In one or more examples, the digital twin 304 can access a traffic channel pool 314 to determine the availability of RF spectrum channels to service a given flight. In one or more examples, the traffic channel pool 314 can represent all of the RF spectrum channels that could possibly used to service a given flight. However, since there can be multiple aircraft in the network at any given time, and the need to reserve certain channels for emergency purposes (described in detail below), not every channel in the traffic channel pool 314 may be available for use by a particular aircraft during the times and locations required by a flight based on its flight plan.

In one or more examples, the digital twin 304 can select a channel or channels from the traffic channel pool 314, which as described above can include available sub-channels 316, reserved channels 318, and restricted traffic channels 320.

In order to allocate an RF channel to an aircraft, the digital twin 304, in one or more examples, can first determine if RF coverage is available for the aircraft during the entirety of its flight. To do so, in one or more examples, the digital twin 304 of the spectrum management system can "geofence" the coverage areas of each of the ground based stations in the network as shown at 306. In one or more examples, a "geofence" 306 can refer to a zone within a coverage area in which there is sufficient RF availability for flight traffic. In one or more examples, when a pilot 302 submits a flight plan, the system can query the geofences 306 to make sure there is RF availability throughout the path of the plan and at all altitudes expressed in the flight plan. In one or more examples of the disclosure, geofences can be shared with the pilot/operator of a flight and can be programmed into the auto-pilot of an aerial vehicle for use during a flight.

In one or more examples, a geofence can be created using a dynamic link budget 308 that is maintained by the digital twin 304. In one or more examples, each geofence 306 can have its own dynamic link budget 308. The dynamic link budget 308 can determine what the RF availability of a given geofence is at any particular moment in time, and can even predict RF availability for a given geofence in the future based on various parameters. In one or more examples, the dynamic link budget 308 can include such parameters as antenna gain, RF losses, receiver sensitivity, power, frequency, spectrum bandwidth, traffic channel size/quantities (i.e., sub-channels, resource blocks), quality of service (QOS) requirements, modulation, spectrum monitoring system results (described in further detail below) and the location of any known co-channel interferers. The dynamic link budget 308 can also include an RF safety margin to ensure a reliable communications signal in the geofence 306. In one or more examples, the operational spectrum management system 322 (described in detail below) can maintain a real-time version of the link budget that changes based on changing conditions in the RF environment. In one or more examples, the digital twin 304 can maintain a model of the link budget, and that dynamic link budget 308 can be used to predict RF conditions at a future time based on the times implicated by a given flight path. In one or more examples, the dynamic link budgets for each geofence can be validated using measurements of RF spectrum activity at each of the base stations in the area to ensure that the dynamic link budgets include the most up-to-date information and accurately reflect the RF environments that the dynamic link budgets are meant to model. In one or more examples, each geofence can be configured to predict coverage based upon components of the flight plans presented to the spectrum management system, the spectrum monitoring systems employed at each base station, the capabilities of the beam/null forming antennas at each base stations, as well as the known locations of other airborne radios. In one or more examples, the actual performance of radio links created at the base stations can be monitored and the information sent to the spectrum managements system for validation and modification of the geofences.

In one or more examples, and as part of the process of allocating RF spectrum channels to an aircraft, the digital twin 304 can cross reference the dynamic link budget with a calibrated RF coverage prediction tool 310. In one or more examples, the RF coverage prediction tool 310 uses appropriate RF prediction models, morphology, topology, antenna pattern characteristics, and antenna elevations to create the dynamic geofence coverage area based upon the remote radio configuration and user requirements. In one or more examples, the RF coverage prediction tool 310 can be used to generate a dynamic link budget for each geofence coverage area that a flight will transit based on its filed flight plan.

In one or more examples of the disclosure, the digital twin 304 can also be configured to determine whether the beam/null steering antenna can simultaneously provide the required lobes and nulls to the intended targets in a manner that will not conflict with one another. As described above, based on the flight plans submitted to the digital twin, the digital twin can have a priori knowledge of potential channel interference between aircraft. For instance, at a particular base station, an airborne radio transiting the airspace at the base station may experience channel interference from the communications being transmitted by an aircraft that it is transiting an adjacent coverage area that is simultaneously communicating with its own respective base station. In one or more examples, and as described above, the beam/null steering antenna can project a lobe (i.e., beam) at the desired signal (i.e., the airborne radio in its coverage area), and point a null signal towards the other aircraft in the adjacent coverage area so as to minimize the interference caused by that aircraft. However, as described above, the antenna can be required to coordinate its elements (i.e., the transmit and receive elements) so that the signals being received and transmitted with one another don't interfere with one another for instance by crossing beams and therefore creating conflicts within the antenna. As a single beam/null steering antenna can be operating numerous communications channels at once, the beam/null steering antenna must make sure that it operates those communications links in a manner that does not cause conflicts (i.e., the beams and nulls don't interfere with one another).

In one or more examples, the digital twin 304 as part of the process of ensuring that a received flight plan has RF availability over the duration of its flight, can simulate and determine if the required lobes and nulls and their directions will cause a conflict in the antenna as described above. If an antenna conflict is detected, the digital twin 304 can alert the operator that the flight plan needs to be adjusted because of the conflict.

During operation of the flight, the network elements implicated by a particular flight plan will transmit communications back and forth between a pilot and a ground-based control system operator. For regulatory and safety purposes, recording these transmissions can be required. Given the sensitive nature of the communications between a pilot and an airborne asset, the security of a communications link (established according to a flight plan by the digital twin) should be impervious to outside threats and be able to provide a legal chain of custody so as to preserve the integrity of the recording of data transmitted between elements in the communications network. In some examples, a legal chain of custody provides a chronological documentation of the control, analysis, and/or data transmission history in an aviation communications network. In other words, when recording transmissions occurring across an established network for a particular flight, each transmission should be verified and then recorded only if the transmission is determined to be legitimate. In one or more examples, a transmission is determined to be legitimate by an access-control list (ACL). In one or more examples, a transmission is legitimate if it is sent from a ground control system to an aircraft and/or it is sent from an aircraft to a ground control system. In this way, a record of a particular flight's data transmission can be created while minimizing the risk that the recording includes unauthorized or inaccurate data that would otherwise corrupt the record.

One way of verifying the authenticity of data or transactions (i.e., transmissions of data between network elements) is to utilize distributed ledger technology to maintain a record of a flight. Distributed ledgers operate as a decentralized database wherein each node of the ledger can independently update data stored on the ledger in a secure manner by only allowing updates to the ledger if there is consensus across nodes of the ledger. As described in further detail below, a distributed ledger can employed in a flight-plan based communications network to create an immutable record of the flight that can comply with the security requirements of various regulatory agencies. In one or more examples, and in addition or alternatively to a distributed ledger, other methods of authenticating data or transactions in the system can be employed. For instance, in one or more examples, received data or transactions can be compared against the expected behavior of the system to verify the authenticity of a transaction. For instance, the timing and identity of a received data or transactions can be verified by determining its timing (i.e., the time it was received) in relation to other data and transactions occurring on a system. In one or more examples, if a received data or transaction was received too quickly or slowly vis-à-vis other transactions (for instance if a received transaction was intended to be in response to a previously received and verified transaction) then the system could decide that the message is not verified or authentic. In one or more examples, the other methods of authenticating data or transactions can be used in conjunction with the distributed ledger techniques described below to provide further assurances that received transactions or data are authentic.

Figure 4:
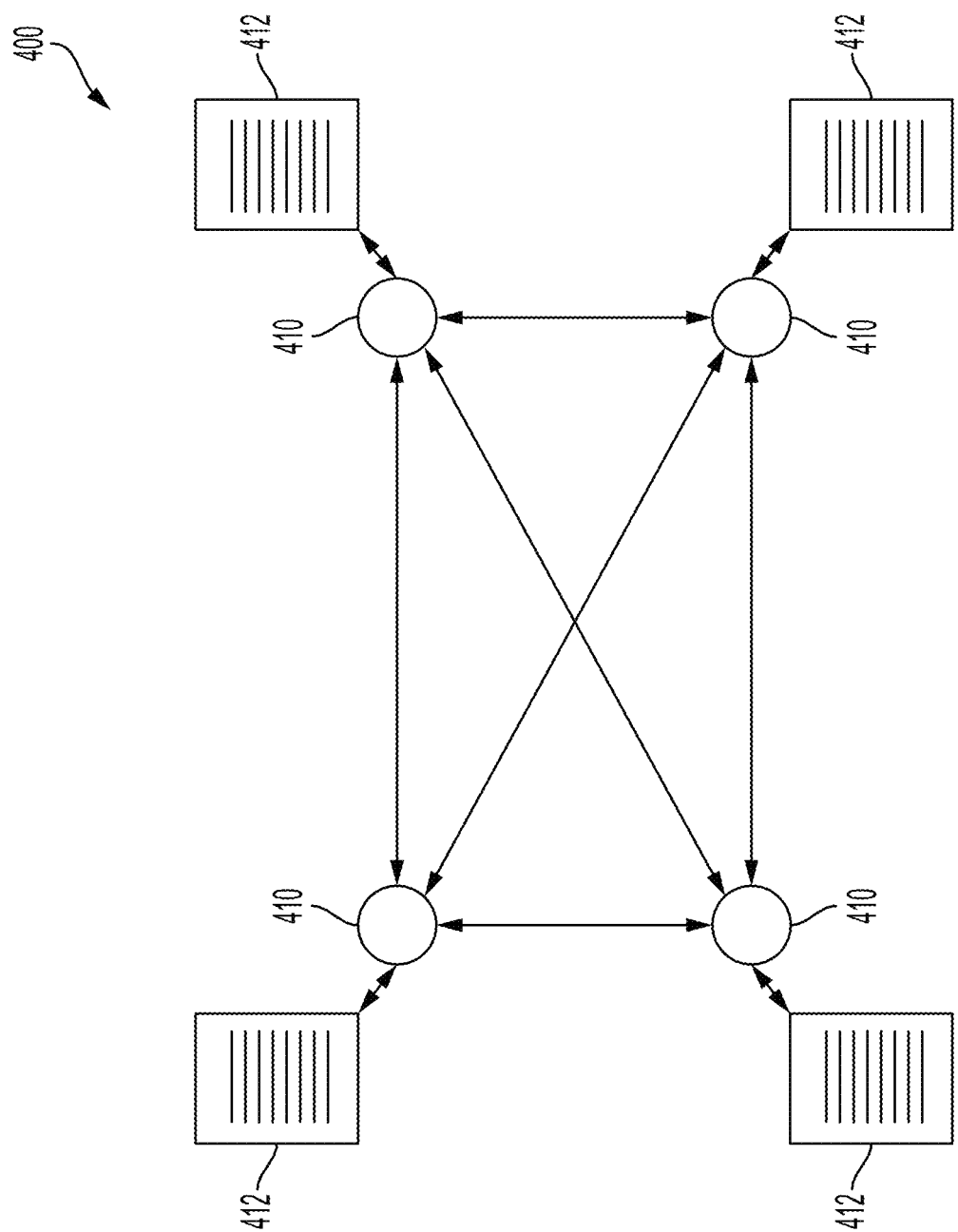
FIG. 4 illustrates an exemplary system using a distributed ledger according to examples of the disclosure.

FIG. 4 illustrates an exemplary distributed ledger system according to examples of the disclosure. In one or more examples, distributed ledger 400 may include one or more distributed ledger nodes 410. The distributed ledger nodes 410 may be distributed in a decentralized form across one or more peoples, institutions, locations, and/or processors. In one or more examples, each node 410 of the distributed ledger 400 can include and maintain a ledger 412 that records data. Each distributed ledger node 410 follows the same protocol to maintain and update its associated ledger 412. For example, when distributed ledger 400 receives new data, the new data is sent to each distributed ledger node 410. Once an individual distributed ledger node 410 receives the new data, it may append this new data to the existing data stored in ledger 412 to form an input data, apply a cryptographic hash function to the input data to generate a hashed output, and store the hashed output to its associated ledger 412. By producing the hashed output using the existing data stored in ledger 412, distributed ledger 400 is able to create a sequential chain of cryptographic hash-linked data that act as a secure and immutable record of the historical ledger information.

Distributed ledger 400 is able to provide further security and verifiability by having each distributed ledger node 410 maintain its ledger 412 independently and then verifying that all distributed ledger nodes 410 result in the same ledger 412. In particular, distributed ledger 400 may be configured such that one or more of the distributed ledger nodes 410 may participate in a consensus with one or more other distributed ledger nodes 410 such that each distributed ledger node 410 in consensus uses the same protocol (e.g., same cryptographic hash function) to maintain and update its associated ledger 412. The distributed ledger nodes 410 that participate in a consensus may exchange ledger information to verify that each distributed ledger node 410 in consensus has the same data stored in its associated ledger 412. In one or more examples, distributed ledger 400 may use Byzantine Fault Tolerance (BFT) to achieve consensus. By having distributed ledger nodes 410 independently record and maintain ledger 412, distributed ledger 400 reduces the risk that an error or centralized attack may pose on the integrity of the data recorded in ledger 412. Distributed ledger 400 may generate a single data record by collecting ledger data from each ledger 412, and using the data that the most number of ledgers 412 agree on in the data record.

The configuration of distributed ledger 400 allows a system that employs distributed ledger 400 to be able to record data in a secure and immutable manner. Distributed ledger 400 could be employed in an aviation communication network to generate a record of communications between airborne assets and the ground such that the record meets reliability, integrity and availability performance targets set forth by regulators. By employing distributed ledger 400 in an aviation communication network, the communication link between airborne assets and the ground could be more secured to outside threats, and can create an immutable record of the communications to be accessed and used by third parties due to regulatory or technical requirements.

Figure 5:
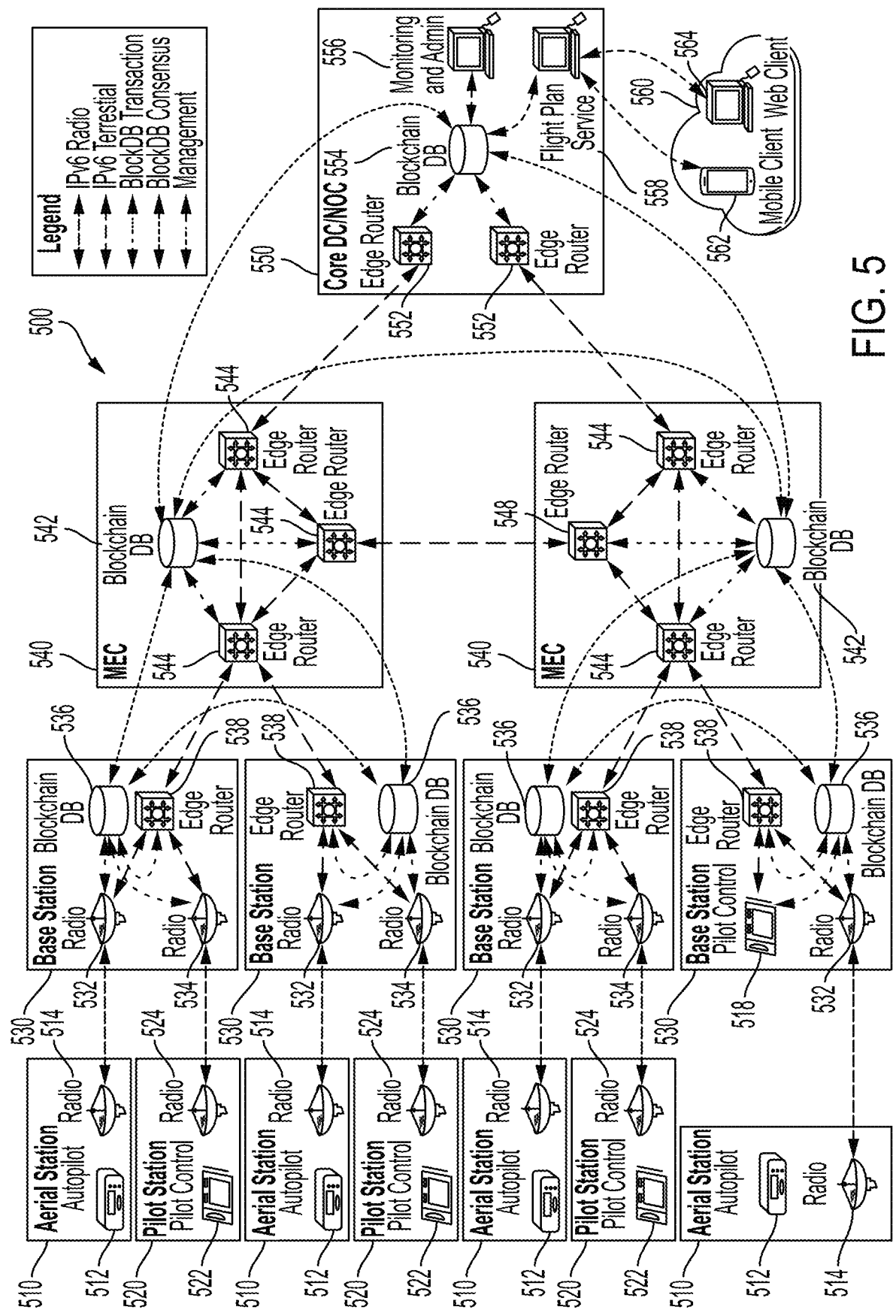
FIG. 5 illustrates an exemplary aviation communication networks with distributed ledger capabilities according to examples of the disclosure.

FIG. 5 illustrates an exemplary aviation communication network with distributed ledger capabilities according to examples of the disclosure. In one or more examples, aviation communication system 500 may include one or more aerial stations 510. Aerial station 510 may include an autopilot 512 and radio 514. In one or more examples, aerial station 510 may be located on an aircraft, such as aircraft 102 illustrated in FIG. 1. In one or more examples, the autopilot 512 can be configured to command and control an aircraft 102 based on transmissions received at the radio 514. The transmissions can be relayed to the radio 514 from a pilot on the ground, who provides commands to aerial station 510 from the ground via a communications network as described above with respect to FIGS. 1-2. In one or more examples, aviation communication system 500 may include one or more pilot stations 520. Pilot station 520 may include pilot control 522 and radio 524. Pilot station 520 may be used by pilots/operators 206 on the ground. In one or more examples, pilots/operators 206 may view flight information based on transmissions from aerial station 510 received at radio 524. In one or more examples, pilots/operators 206 may provide commands to aerial station 510 via a communications network as described above with respect to FIGS. 1-2.

In one or more examples, aviation communication system 500 may include one or more base stations 530. Base station 539 may be configured to transmit communications between the ground and the airborne assets. In one or more examples, base station 530 may include a radio 532 and a radio 534. In one or more examples, radio 532 may exchange telemetry packets with radio 514 of aerial station 510. In one or more examples, the packet exchange between radio 532 and radio 514 may use Internet Protocol version 6 (IPv6) as a protocol to format the transmission of the data. In one or more examples, radio 534 may exchange telemetry packets with radio 524 of pilot station 520. In one or more examples, the packet exchange between radio 532 and radio 514 may use IPv6 as a protocol to format the transmission of the data. In one or more examples, telemetry packets may be generated by an aircraft such as aircraft 102 from FIG. 1. In one or more examples, telemetry packets may be generated by a pilot such as a pilot 206 from FIG. 2. In one or more examples, telemetry packets may be generated by and transmitted between edge routers such as edge routers 538, 544, and 552.

In one or more examples, base station 530 may include edge router 538 to transmit communications between the ground and the airborne assets. Radio 532 and radio 534 may exchange telemetry packets with edge router 538. In one or more examples, the telemetry packets communicated by radio 532 may include flight information from aerial station 510. In one or more examples, the telemetry packets communicated to radio 534 may include command information provided by pilots/operators 206. The packet exchange between radio 532, radio 534, and edge router 538 may use IPv6 as a protocol to format the transmission of the data.

In one or more examples, base station 530 may be configured to act a distributed ledger node by including a base station database 536 (e.g., blockchain database) to store ledger information. In one or more examples, radio 532, radio 534, and edge router 538 may communicate data packets with base station database 536. In one or more examples, the data packets communicated with base station database 536 may be used to update ledger data stored at the base station database 536. In response to receiving data packets, base station database 536 may update its ledger data by appending the new data packet to the existing ledger data to generate an input data, applying a cryptographic hash function to the input data to generate a hashed output, and storing this hashed output to base station database 536 as an updated ledger information. In one or more examples, the one or more base station databases 536 may be in consensus such that the same ledger data is stored at each base station database 536.

In one or more examples, base station 530 may include a pilot control 518. Pilot control 518 may exchange telemetry packets with edge router 538. The packet exchange between pilot control 518 and edge router 538 may use IPv6 as a protocol to format the transmission of the data. In one or more examples, pilot control 518 may communicate data with base station database 536. In one or more examples, the data communicated between pilot control 518 and base station database 536 may be used to construct ledger data at the base station database 536.

In one or more examples, aviation communication system 500 may include one or more MEC system 540 with one or more edge routers 544. Edge routers 544 may exchange data packets with each other, wherein the data packets contain communications between airborne assets and the ground. In one or more examples, packet exchange between edge routers 544 use IPv6 as a protocol to format the transmission of the data. In one or more examples, at least one edge router 544 of MEC system 540 may transmit telemetry packets with edge router 538 of base station 530.

In one or more examples, MEC system 540 may be configured to act a distributed ledger node by including MEC database 542 (e.g., blockchain database) to store ledger information. In one or more examples, edge routers 544 may communicate data packets with MEC database 542. In one or more examples, the data packets communicated with MEC database 542 may be used to update ledger data stored at the MEC database 542. In response to receiving data packets, MEC database 542 may update its ledger data by appending the new data packet to the existing ledger data to generate an input data, applying a cryptographic hash function to the input data to generate a hashed output, and storing this hashed output to MEC database 542 as an updated ledger information. In one or more examples, MEC database 542 is in consensus with base station database 536 such that ledger data stored at MEC database 542 is in agreement with ledger data stored at base station database 536. In one or more examples, one or more MEC databases 542 are in consensus such that ledger data stored at MEC databases 542 may be in agreement.

In one or more examples, aviation communication system 500 may include core DC 550. In one or more examples, core DC 550 may include one or more edge routers 552 that exchange data packets with edge router 544 of MEC system 540. The data packets transmitted to and from edge routers 552 may include communications between airborne assets and the ground. In one or more examples, packet exchange between edge router 544 of MEC system 540 and edge router 552 of core DC 550 may use IPv6 as a protocol to format the transmission of the data.

In one or more examples, core DC 550 may be configured to act as a distributed ledger node by including a core DC database 554 (e.g., blockchain database). In one or more examples, edge routers 552 may communicate data packets with core DC database 554. In one or more examples, the data communicated may be used to construct ledger data at core DC database 554. In one or more examples, the data packets communicated between edge routers 552 and core DC database 554 may be used to update ledger data stored at the core DC database 554. In response to receiving data packets, core DC database 554 may update its ledger data by appending the new data packet to the existing ledger data to generate an input data, applying a cryptographic hash function to the input data to generate a hashed output, and storing this hashed output to core DC database 554 as an updated ledger information. In one or more examples, core DC database 554 can be in consensus with MEC database 542 such that ledger data stored at core DC database 554 is in agreement with ledger data stored at MEC database 542. In one or more examples, core DC database 554 can be in consensus with base station database 536 such that ledger data stored at core DC database 554 is in agreement with ledger data stored at base station database 536.

In one or more examples, core DC 550 may include monitoring and administration station 556. Monitoring and administration station 556 may include one or more processors. In one or more examples, monitoring and administration station 556 may provide an interface to the spectrum management system 202 to support access control policy for planned, active and completed flight information. Monitoring and administration station 556 may also manage access to specifically predefined data that is transmitted or stored in the aviation communication system 500. For example, monitoring and administration station 556 may utilize filtering techniques to allow internal and external services to access information that enable and support the flight mission. In one or more examples, monitoring and administration station 556 may provide a performance reporting function on the data integrity after the completion of a flight.

In one or more examples, core DC 550 may include flight plan service 558. In one or more examples, flight plan service 558 may include one or more processors. In one or more examples, flight plan service 558 may receive flight plan information.

In one or more examples, aviation communication system 500 includes user interface 560 to receive flight plan information from an authorized user and/or to transmit flight plan information to flight plan service 558. In one or more examples, user interface 560 may include a mobile client 562 that runs on mobile devices. In one or more examples, user interface 564 may include web client 564 that runs on internet-enabled devices.

In one or more examples, flight plan service 558 may relate flight plan information to one or more network elements in the aviation communication system 500 as described by FIG. 3. By relating the flight plan information to one or more networks elements, the aviation communication network 500 may be initialized on a flight plan by flight plan basis. In particular, the identified network elements may be initialized as distributed ledger nodes with ledger information stored at each distributed ledger node in an associated database. In one or more examples, flight plan service 558 may communicate the flight plan information to the one or more network elements identified with the flight plan, and the network elements initialize the associated ledger information with the flight plan information. A process to initialize aviation communication system 500 is illustrated in FIG. 6.

Figure 6:
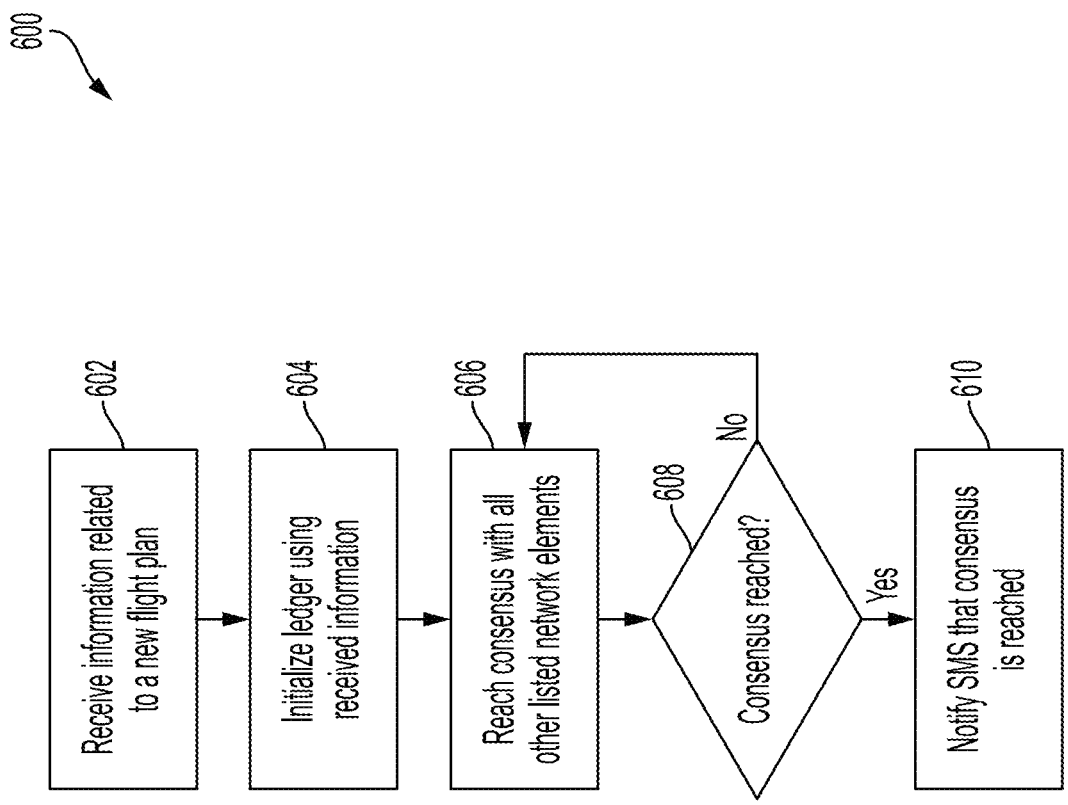
FIG. 6 illustrates an exemplary process for initializing the distributed ledger according to examples of the disclosure.

FIG. 6 illustrates an exemplary process for initializing the aviation communication system with distributed ledger capabilities according to examples of the disclosure. In one or more examples, the flight plan information may be received by core DC 550. Once the aviation communication network 500 receives the flight plan information, spectrum management system 202 at core DC 550 may relate the flight plan information to identify and initialize one or more network elements in aviation communication system 500 that are implicated in the flight plan. In one or more examples, initialization process 600 may begin at step 602 wherein a network element of aviation communication system 500 that is implicated by the flight information receives information related to the new flight plan information. The flight plan information received by a network element may include time, flight route, durations, speeds, elevations, locations, airframe type, radio and antenna configuration and/or data throughput information. In one or more examples, the flight information received in step 602 may include one or more network elements in aviation communication system 500 that are related to the flight plan. In one or more examples, the flight information received in step 602 may include one or more network elements in aviation communication system 500 that are in consensus.

In one or more examples of the disclosure, a spectrum management system such as the one described above with respect to FIGS. 2-3 can be used to identify one or more network elements for a given flight plan. When a ground-based operator submits a flight plan to the spectrum management system, the spectrum management system can plan the flight (from a communications link perspective) so as to ensure that the flight is provided with a reliable communications link throughout the duration of the flight. Once a communications link plan has been established, the network elements implicated by that link plan can be associated with the flight plan. Thus, at step 602, the flight plan can include an identification of the network elements associated with the flight plan as determined by the spectrum management system.

After receiving a flight plan with an identification of network elements at step 602, the process 600 can move to step 604 wherein a ledger stored in a database at the network element can initialized with the flight information received in step 602. In one or more examples, the network element may initialize ledger information by applying a cryptographic hash function to the flight information, and storing the output of the cryptographic hash function in a memory. In one or more examples, the ledger includes information of the network elements in aviation communication system 500 identified by the flight information received in step 602. In one or more examples, the ledger information identifies one or more network elements in aviation communication system 500 that participate in a consensus.

In one or more examples, in addition to including the network elements of an aviation communication identified or implicated by the flight information received in step 602, at step 604, the distributed ledger can also include additional network elements that contribute to the mission of the flight plan, but may not necessarily be part of the communications link itself. For instance, in one or more examples, the distributed ledger can include radars facilities associated with a particular flight plan, or other ground support facilities that are employed when a flight is executing on a flight plan. In one or more examples, the additional network elements that contribute to the mission of the flight plan can be associated with the communications network that provides the communications link between an aircraft and the ground, or in one or more examples, can be associated with third-party networks that aren't part of the communications network, but still help to service a flight plan flying within the communication network.

In one or more examples, if a third-party service provides the flight plan to the network, for instance through an application programming interface (API) or other method for sending a flight plan to the spectrum management system, then the third-party can also be identified as a member of the network for purposes of creating a distributed ledger (as described below with respect to step 606). In one or more examples, the API itself can work to ensure that the spectrum management system has adequate information about the third-party service, to ensure that the third-party service can be included as a node in the distributed ledger. In this way, the transmission of the flight plan from the third-party to the spectrum management system (or aviation communications network) can be a part of the record of a given flight plan such that in the event that the record of a particular flight is to be later accessed, then as part of that record, the transmission of the flight plan and the transmission's contents are part of the record and can also be accessed.

After initializing the ledger at step 604, the process 600 can move to step 606, wherein the network elements identified as participating in a consensus may perform a consensus process to ensure that the ledger information at all distributed ledger nodes are the same. In one or more examples, the consensus algorithm may involve the network element sending its ledger information to other network elements participating in the consensus. In one or more examples, the consensus algorithm may involve the network element receiving ledger information from other network elements participating in the consensus. The network element may then compare the ledger information received from the other network elements with each other and with the ledger information associated with the network element. In or more examples, the network element may update the associated ledger information such that the ledger information is in agreement with a majority of the received ledger information from other network elements participating in a consensus. In one or more elements, the updated ledger information is linked to the historical ledger information through keys and/or cryptographic signatures.

In one or more examples, the consensus described above with respect to step 606 can be conducted before the flight mission takes place, such that the distributed ledger for a given flight plan is established before the flight occurs. However, in addition to conducting a consensus procedure before a flight begins, in one or more examples, the consensus process described above at step 606 can be periodically conducted throughout the flight, thereby increasing the amount of security of a network associated to the flight plan.

In one or more examples, the consensus can be conducted a pre-determined periodicity. For instance, in one or more examples, the consensus process can be performed after every transaction involving the flight plan (i.e., data being transmitted between the various components associated with the flight plan) thus making the periodicity of the consensus process nearly continuous. Alternatively, or additionally, the consensus process can be performed after a pre-determined number of transmissions between the elements in the network has occurred.

In one or more examples, the periodicity of the consensus updates can be based on the latency requirements of the communication network being used to implement the flight plan. Performing the consensus process can use computing resources and cause transmissions between network elements to become delay. While this latency may be tolerated when the periodicity of the consensus process is low (i.e., consensus is done only once or not very often), increased periodicity may lead to a latency in communications that does not meet the specifications of the communications network. In one or more examples, the hashing functions and encryption associated with the distributed ledger can be selected based on the required periodicity of the consensus process. For instance, in the event that a high periodicity is desired, a lightweight and less resource-dependent encryption scheme can be employed such that the increased periodicity will not lead to an out of specification latency in the communications channel.

In one or more examples, the consensus process can be segmented such that not every element in the communications network or associated network elements need to be part of the consensus process each time the consensus process is executed for a given flight plan. As an example, when a flight plan is first transmitted to a spectrum management system from a third-party, the third-party could be part of the consensus process performed prior to the flight being executed. However, during operation of the flight, if further consensus processes are to be carried out, then in one or more examples, the consensus process may not need to include the third-party system that provided the flight plan, and only include the elements in the network that are actively engaged in supporting the flight plan. By segmenting the consensus in this manner, the overall latency created by the distributed ledger process can be minimized.

In step 608, process 600 determines if a consensus is reached. If a consensus is not reached, there may have been an error in the transmission of the data packets or in the initialization process. In one or more examples, if it is determined that consensus is not achieved, core DC 550 is notified that an error has occurred. In one or more examples, if it is determined that consensus is not achieved, steps 606 and 608 are repeated until consensus is reached and all network elements participating in the consensus have the same ledger information.

If in step 608, it is determined that consensus has been reached, process 600 continues to step 610. In step 610, the network element may notify the spectrum management system 202 at core DC 550 that consensus has been achieved. In one or more examples, aviation communication system 500 may begin to transmit data packets after receiving notification that consensus has been achieved.

Once process 600 is complete, aviation communications network 500 is configured such that the network elements implicated in the received flight plan information are initialized as distributed ledger nodes that are in consensus. The aviation communications network 500 is then prepared to begin the flight plan, and transmit data packets for the communication between airborne assets and the ground. During the execution of the flight plan, the distributed ledger of aviation communications network 500 is updated such that the ledger information provides a secure and immutable record of the communications between airborne assets and the ground. When transmitting data packets, network elements in aviation communication system 500 may update ledger information using process 700 as described below.

Figure 7:
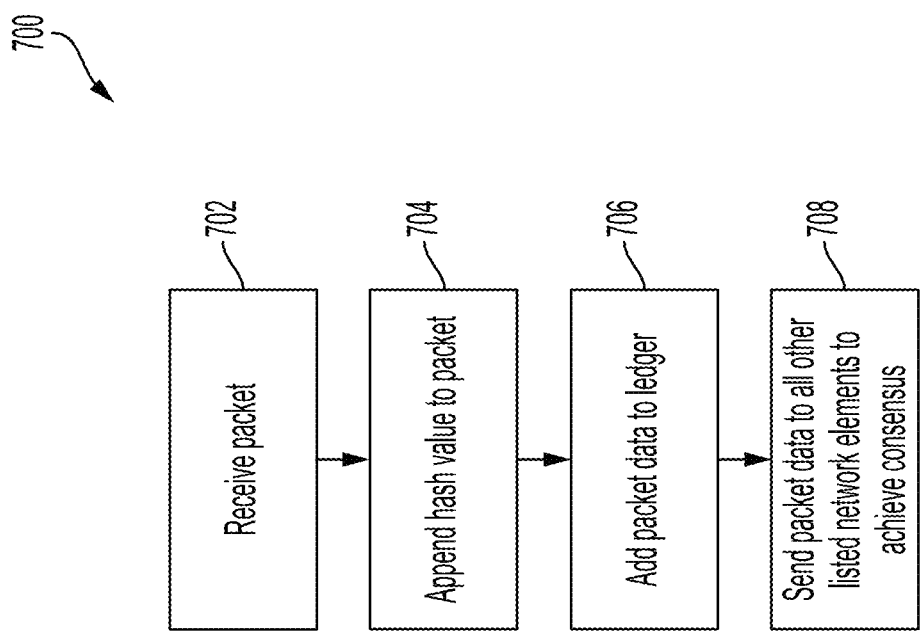
FIG. 7 illustrates an exemplary process for updating the distributed ledger during the execution of a flight plan according to examples of the disclosure.

FIG. 7 illustrates an exemplary process for updating the distributed ledger during the execution of a flight plan according to examples of the disclosure. Process 700 may be performed by a network element after it receives a data packet from another network element.

Process 700 may begin at step 702, wherein the network element may receive a data packet 702. In some examples, the data packet may be transmitted using IPv6 as a protocol to format the transmission of the data.

In step 704, the network element may append the data received in step 702 to the existing data stored in its ledger to form an input data, apply a cryptographic hash function to the input data to generate a hashed output, and append the hashed output to the data packet In some examples, the cryptographic hash function used to generate the hashed output may depend on the direction the data packet is transmitted, the source of the data packet, and/or the destination of the packet, such that the hashed output may provide a record of the transmission history of a data packet. In some examples, the direction of the data packet depends on whether the data packet is transmitted from the aircraft to the ground control system or from the ground control system to the aircraft. In some examples, the cryptographic hash function may be a SHA1 function, and/or a MD5 function. In one or more examples, the network element may append a hashed output generated from one type of cryptographic hash function to incoming packets, and another hashed output generated from another type of cryptographic hash function to outgoing packets. In one or more examples, the type of cryptographic hash function used to generate the hash values appended to one packet may be used to determine the direction, source network element that transmitted the packet, and/or target network element that received the packet.

In step 706, the network element may transform data from the packet generated from step 704 to a data structure and store the data structure in a ledger associated with the network element. After the network element adds the data structure to its ledger, the network element continues to step 708 to reach consensus with the other network elements participating in consensus. To reach consensus, the network element sends a copy of the data structure to other network elements participating in consensus such that the other network elements may update their associated ledgers with the data structure to achieve consensus.

In one or more examples, the executed flight plan may deviate from the initial flight plan used to initialize the aviation communication system 500 in process 600. The deviation in the flight may be in time, flight route, durations, speeds, elevations, locations, airframe type, radio and antenna configuration and/or data throughput information. A deviation in the flight plan may modify (e.g., add or remove) the network elements implicated by the flight plan. If the deviation in flight plan changes the implicated network elements, the aviation communication system 500 can modify the network elements of aviation communication system 500 associated with the flight according to the deviated flight plan, and the distributed ledger can reestablish consensus.

Figure 8:
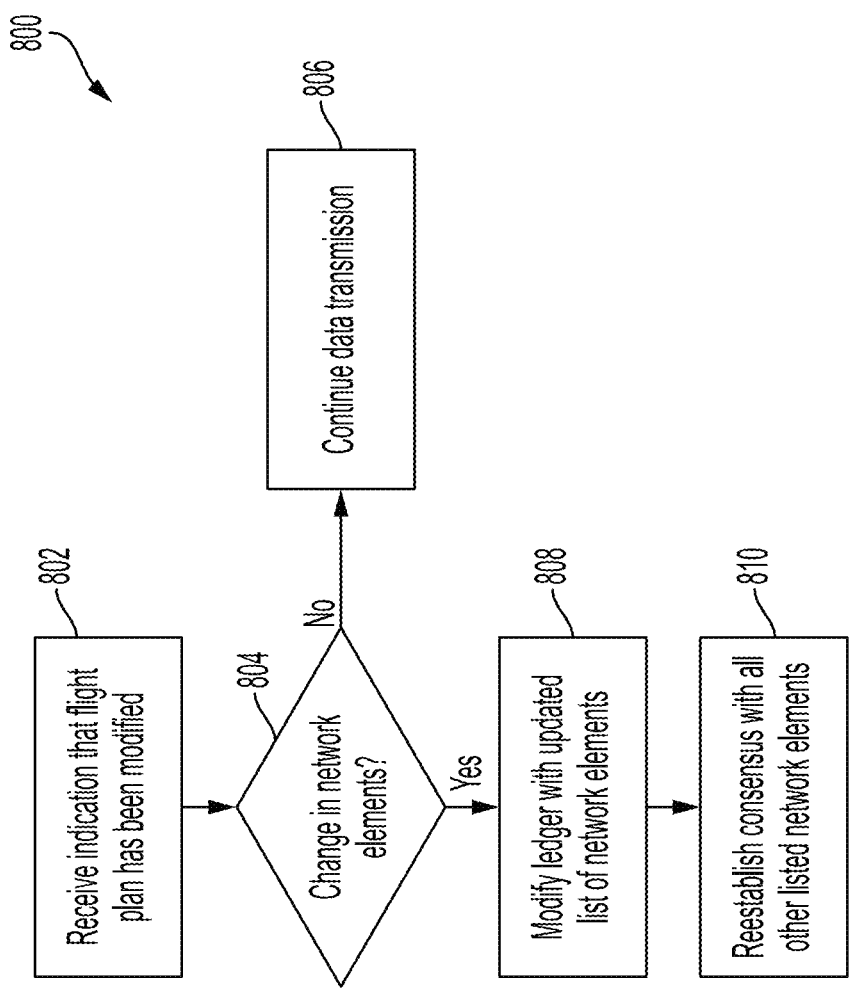
FIG. 8 illustrates an exemplary process for modifying the distributed ledger in the event a flight plan is modified according to examples of the disclosure.

FIG. 8 illustrates an exemplary process for modifying the distributed ledger in the event a flight plan is modified according to examples of the disclosure. In one or more examples, the process 800 of FIG. 8 can begin at step 802 wherein a network element may receive an indication that there has been a deviation by the aircraft such that the flight plan has been modified. In one or more examples, this indication may be transmitted by core DC 550.

In one or more examples, after receiving the indication of a deviation at step 802, the process 800 can move to 804 wherein the spectrum management system or other processing entity that administers the distributed ledger can determine if the network elements associated with this modified flight plan differs from network elements associated with the original flight plan. In one or more examples, flight plan service 558 of core DC 550 may determine if there is a change in network elements and transmit this information to the network elements currently associated with aviation communication system 500. In one or more examples, an authorized user may input information related to a change in network elements through the monitoring and administration station 556 at core DC 550, and core DC 550 and transmits this information to the network elements currently associated with aviation communication system 500.

If in step 804, it is determined that the modified flight plan does not change the network elements associated with aviation communication system 500 (e.g. the modified flight plan does not involve adding new network elements to the aviation communication system 500 or removing existing network elements from the current aviation communication system 500), the network element proceeds to step 806 and continues data transmission as described by process 700.

If in step 804 it is determined that the modified flight plan modifies the network elements associated with aviation communication system 500, the process 800 can proceed to step 808 wherein the list of network elements identified with the modified flight plan are updated.

As part of the process of modifying the nodes on the distributed ledger, at step 808, the aviation communications network 500 establishes an updated distributed ledger with distributed ledger nodes based on the modified list of network elements. The aviation communications network 500 with the updated distributed ledger reestablishes consensus with the other network elements of the updated distributed ledger system. In some examples, a network element can send its associated ledger information to other network elements participating in consensus in the updated distributed ledger, receive ledger information from other network elements participating in consensus in the updated distributed ledger, and performs the consensus process as described above. In some example, the consensus process includes transmitting the data previously recorded at each node of the distributed ledger system associated with the originally received flight plan.

Once the flight is completed, the communications in the aviation communication system 500 terminates, and a secure and immutable record of the communication during the flight plan is generated and stored. Upon termination of the flight plan, the network elements associated with flight plan may perform an inactivation process as described in by process 900 in FIG. 9.

Figure 9:
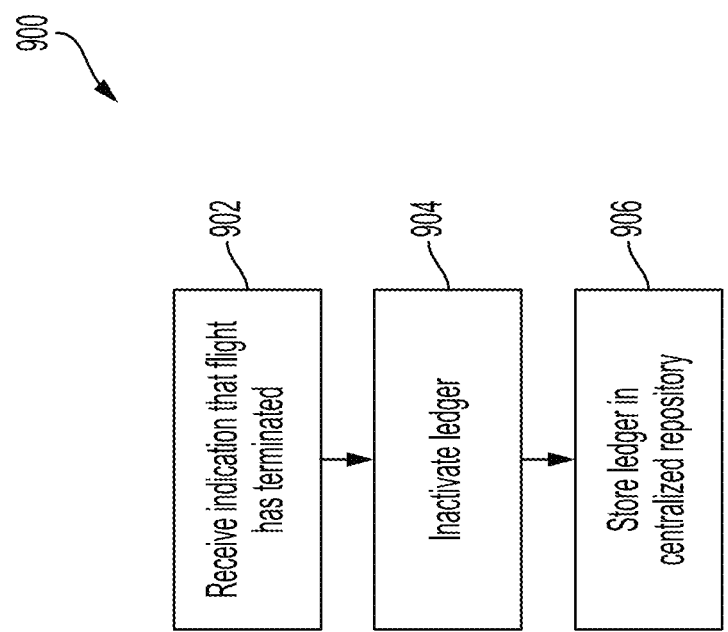
FIG. 9 illustrates an exemplary process for processing the distributed ledger after the flight plan has been terminated.

FIG. 9 illustrates an exemplary process for processing the distributed ledger after the flight plan has been terminated. In step 902, a network element receives an indication that the flight has been terminated. In one or more examples, the indication may be transmitted by aerial station 510 after the airborne asset landed or after the radio 514 is turned off. In one or more examples, the indication may be transmitted by pilot station 520 after the pilot turns off radio 524. In one or more examples, and authorized user may input an indication that the flight has been terminated at user interface 560 and the indication is then transmitted by core DC 550 to network elements in aviation communication system 500.

After the network element receives an indication that the flight has been terminated in step 902, the network element proceeds to step 904. In step 904, the network element inactivates its associated ledger, and the network element is no longer associated with the flight plan. Once the network element is no longer associated with the flight plan, communications in the aviation communication system 500 is no longer recorded by the network element.

In step 906, the network element stores its associated ledger information in a centralized repository. The associated ledger information contains a secure and immutable record of the communications related to the completed flight plan. In one or more examples, each network element stores its associated ledger information in the centralized repository, such that the centralized repository contains multiple copies of the ledger information. In one or more examples, the network elements reach consensus, and only one copy of the ledger information is stored in the centralized repository. In one or more examples, the ledger information is communicated to the centralized repository through WiFi or any other internet-based communication link.

Figure 10:
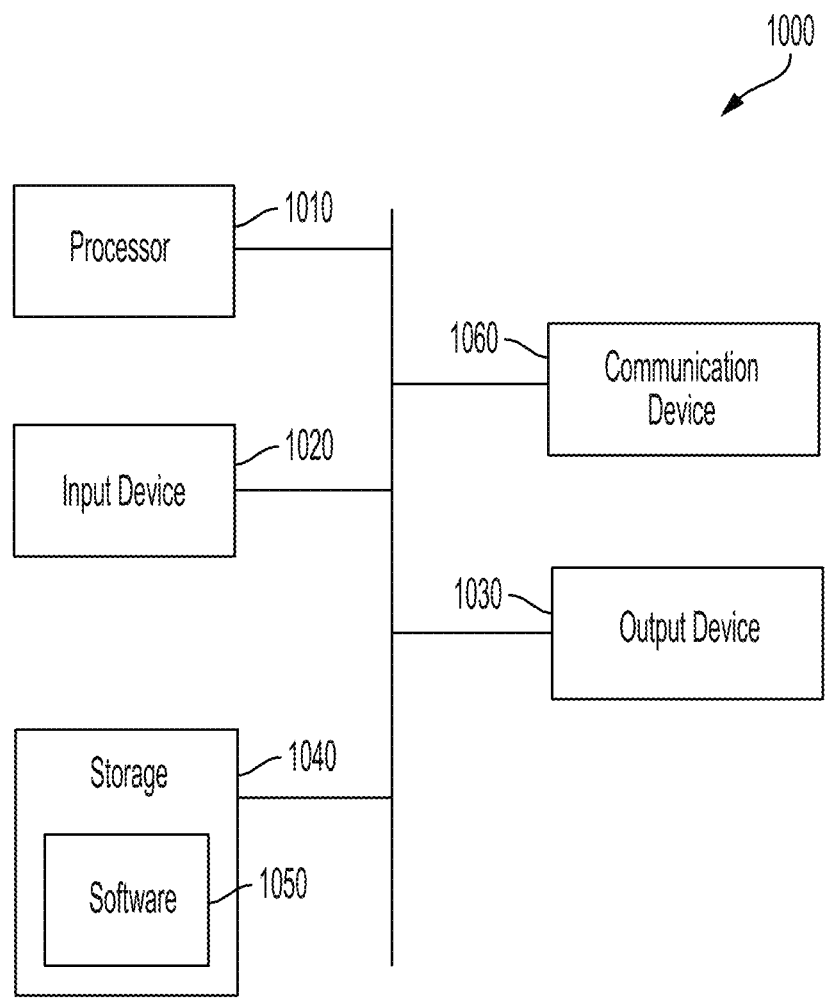
FIG. 10 illustrates an exemplary computing system, according to examples of the disclosure.

FIG. 10 illustrates an exemplary computing system, according to examples of the disclosure. FIG. 10 illustrates an example of a computing system 1000, in accordance with some embodiments system 1000 can be a client or a server. As shown in FIG. 10, system 1000 can be any suitable type of processor-based system, such as a personal computer, workstation, server, handheld computing device (portable electronic device) such as a phone or tablet, or dedicated device. The system 1000 can include, for example, one or more of input device 1020, output device 1030, one or more processors 1010, storage 1040, and communication device 1060. Input device 1020 and output device 1030 can generally correspond to those described above and can either be connectable or integrated with the computer.

Input device 1020 can be any suitable device that provides input, such as a touch screen, keyboard or keypad, mouse, gesture recognition component of a virtual/augmented reality system, or voice-recognition device. Output device 1030 can be or include any suitable device that provides output, such as a display, touch screen, haptics device, virtual/augmented reality display, or speaker.

Storage 1040 can be any suitable device that provides storage, such as an electrical, magnetic, or optical memory including a RAM, cache, hard drive, removable storage disk, or other non-transitory computer readable medium. Communication device 1060 can include any suitable device capable of transmitting and receiving signals over a network, such as a network interface chip or device. The components of the computing system 1000 can be connected in any suitable manner, such as via a physical bus or wirelessly.

Processor(s) 1010 can be any suitable processor or combination of processors, including any of, or any combination of, a central processing unit (CPU), field programmable gate array (FPGA), and application-specific integrated circuit (ASIC). Software 1050, which can be stored in storage 1040 and executed by one or more processors 1010, can include, for example, the programming that embodies the functionality or portions of the functionality of the present disclosure (e.g., as embodied in the devices as described above)

Software 1050 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 1000 can implement any operating system suitable for operating on the network. Software 1050 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description, features are described herein as part of the same or separate embodiments; however, it will be appreciated that the scope of the disclosure includes embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for operating a flight plan based distributed ledger system implemented on an aviation communications network, the method comprising:

receiving a flight plan, wherein the received flight plan comprises timing, location, and altitude information for a flight that is to fly in one or more coverage areas of an aviation communications network;

determining one or more communication elements of the aviation communications network associated with the received flight plan;

operating the determined one or more communication elements of the aviation communications network associated with the received flight plan to communicate with an aircraft, wherein operating the determined one or more communication elements of the aviation communications network associated with the received flight plan to communicate with the aircraft comprises:

initiating a distributed ledger system on the one or more communication elements determined to be associated with flight plan, wherein the distributed ledger comprises one or more nodes, and wherein initiating the distributed ledger system on the one or more communication elements determined to be associated with the flight plan comprises:

configuring each communication element of the one or more communication elements determined to be associated with the flight plan to operate as a node in the distributed ledger system;

while the aircraft is executing the received flight plan:
recording data associated with one or more communication transmissions occurring between the one or more communications elements during the flight operating under the received flight plan on the distributed ledger system, wherein recording the data on the distributed ledger system comprises recording the data at each node of the distributed ledger system in accordance with a consensus process for securing communications between the one or more communications elements;

determining when the flight operating under the flight plan has terminated; and when it is determined that the flight operating under the flight plan has terminated, transmitting the data recorded at each node of the distributed ledger system to a memory for storage.

2. The method of claim 1, wherein determining one or more communication elements of the aviation communications network associated with the received flight plan comprises determining which elements of the aviation communications network will be used to establish a communications link between a ground-based operator of the flight and an airborne radio associated with the flight plan during operation of the flight, based on the received flight plan.

3. The method of claim 1, wherein initiating a distributed ledger system on the one or more communication elements determined to be associated with flight plan comprises:

transmitting the received flight plan to each communication element of the aviation communications network associated with the received flight plan;

at each communication element of the aviation communications network, applying a cryptographic hash function to the received flight plan; and storing an output of the cryptographic hash function in a database located at each communication element of the aviation communications network associated with the received flight plan.

4. The method of claim 3, wherein the transmitted flight plan includes a list of the one or more communication elements associated with the received flight plan.

5. The method of claim 3, wherein initiating a distributed ledger system on the one or more communication elements determined to be associated with flight plan comprises:

applying a consensus process on the output of the cryptographic hash function stored in each database of each communication element of the one or more communication elements determined to be associated with flight plan;

determining if the output of the cryptographic hash function stored in each database of each communication elements are in agreement with each other; and if it is determined that the output of the cryptographic hash function stored in each database of each communication elements are in agreement with each other, authorizing data to be transmitted between the communication elements to establish a communications link between a ground based operator and an aerial radio associated with an aircraft performing the received flight plan.

6. The method of claim 1, wherein recording data associated with one or more communication transmissions occurring between the one or more communications elements during the flight operating under the received flight plan on the distributed ledger system comprises:

receiving a data transmission at a communications element of the one or more communications elements;

appending a hash value to the received data transmission at the communications element;

adding the received data transmission and the appended hash value to the database of the communications element; and transmit the received data transmission and the appending hash value to the other communications elements of the one or more communications elements.

7. The method of claim 6, wherein the hash value appended to the received data transmission at the communications element is based on the direction of transmission of the received data through the communications network.

8. The method of claim 7, wherein the direction of transmission comprises transmissions from the ground based operator to an aerial radio associated with an aircraft performing the received flight plan.

9. The method of claim 7, wherein the direction of transmission comprises transmissions from an aerial radio associated with an aircraft performing the received flight plan to the ground based operator.

10. The method of claim 6, wherein the appended hash value comprises an output from an SHA1 function.

11. The method of claim 10, wherein the appended hash value comprises an output from an MD5 function.

12. The method of claim 11, wherein the SHA1 function output is appended for a first direction of transmission.

13. The method of claim 12, wherein the MD5 function output is appended for a second direction of transmission.

14. The method of claim 6, wherein the method comprises adding the transmitted data transmission to the database of each communications element of the other communications elements that received the transmitted data transmission.

15. The method of claim 1, wherein the method comprises, when it is determined that the flight operating under the flight plan has terminated, inactivating the distributed ledger system, and wherein the method comprises, once the distributed ledger system is inactivated, receiving the data recorded at each node and storing the received data in a memory.

16. The method of claim 1, wherein the method comprises:
receiving an indication that the received flight plan has been modified;
determining whether the one or more communication elements of the aviation communications network associated with the received flight plan has changed based on the received indication that the flight plan has been modified; and
modifying the distributed ledger system to include one or new communications elements associated with the changed one or more communication elements.

17. The method of claim 16, wherein the method comprises applying a consensus process to the modified distributed ledger system, wherein applying the consensus process comprises transmitting the data previously recorded at each node of the distributed ledger system associated with the originally received flight plan to one or more new communication elements associated with the modified flight plan.

18. A system for operating a flight plan based distributed ledger system implemented on an aviation communications network, the system comprising:
a memory;
one or more processors;
wherein the memory stores one or more programs that when executed by the one or more processors, cause the one or more processors to:
receive a flight plan, wherein the received flight plan comprises timing, location, and altitude information for a flight that is to fly in one or more coverage areas of an aviation communications network;
determine one or more communication elements of the aviation communications network associated with the received flight plan;
operate the determined one or more communication elements of the aviation communications network associated with the received flight plan to communicate with an aircraft, wherein operating the determined one or more communication elements of the aviation communications network associated with the received flight plan to communicate with the aircraft comprises:
initiate a distributed ledger system on the one or more communication elements determined to be associated with flight plan, wherein the distributed ledger comprises one or more nodes, and wherein initiating the distributed ledger system on the one or more communication elements determined to be associated with the flight plan comprises:
while the aircraft is executing the received flight plan:
record data associated with one or more communication transmissions occurring between the one or more communications elements during the flight operating under the received flight plan on the distributed ledger system, wherein recording the data on the distributed ledger system comprises recording the data at each node of the distributed ledger system in accordance with a consensus process for securing communications between the one or more communications elements;
determine when the flight operating under the flight plan has terminated; and
when it is determined that the flight operating under the flight plan has terminated, transmit the data recorded at each node of the distributed ledger system to a memory for storage.

19. The system of claim 18, wherein determining one or more communication elements of the aviation communications network associated with the received flight plan comprises determining which elements of the aviation communications network will be used to establish a communications link between a ground based operator of the flight and an airborne radio associated with the flight plan during operation of the flight, based on the received flight plan.

20. The system of claim 18, wherein initiating a distributed ledger system on the one or more communication elements determined to be associated with flight plan comprises:
transmitting the received flight plan to each communication element of the aviation communications network associated with the received flight plan;
at each communication element of the aviation communications network, applying a cryptographic hash function to the received flight plan; and
storing an output of the cryptographic hash function in a database located at each communication element of the aviation communications network associated with the received flight plan.

21. The system of claim 20, wherein the transmitted flight plan includes a list of the one or more communication elements associated with the received flight plan.

22. The system of claim 20, wherein initiating a distributed ledger system on the one or more communication elements determined to be associated with flight plan comprises:
applying a consensus process on the output of the cryptographic hash function stored in each database of each communication element of the one or more communication elements determined to be associated with flight plan;
determining if the output of the cryptographic hash function stored in each database of each communication elements are in agreement with each other; and
if it is determined that the output of the cryptographic hash function stored in each database of each communication elements are in agreement with each other, authorizing data to be transmitted between the communication elements to establish a communications link between a ground based operator and an aerial radio associated with an aircraft performing the received flight plan.

23. The system of claim 18, wherein recording data associated with one or more communication transmissions occurring between the one or more communications elements during the flight operating under the received flight plan on the distributed ledger system comprises:
receiving a data transmission at a communications element of the one or more communications elements;
appending a hash value to the received data transmission at the communications element;
adding the received data transmission and the appended hash value to the database of the communications element; and
transmitting the received data transmission and the appending has value to the other communications elements of the one or more communications elements.

24. The system of claim 23, wherein the hash value appended to the received data transmission at the communications element is based on the direction of transmission of the received data through the communications network.

25. The system of claim 24, wherein the direction of transmission comprises transmissions from the ground based operator to an aerial radio associated with an aircraft performing the received flight plan.

26. The system of claim 24, wherein the direction of transmission comprises transmissions from the aerial radio associated with an aircraft performing the received flight plan to the ground based operator.

27. The system of claim 23, wherein the appended hash value comprises an output from an SHA1 function.

28. The system of claim 27, wherein the appended hash value comprises an output from an MD5 function.

29. The system of claim 28, wherein the SHA1 function output hash value is appended for a first direction of transmission.

30. The system of claim 29, wherein the MD5 function output hash value is appended for a second direction of transmission.

31. The system of claim 23, wherein the one or processors are caused to add the transmitted data transmission to the database of each communications element of the other communications elements that received the transmitted data transmission.

32. The system of claim 23, wherein the one or more processors are caused to, when it is determined that the flight operating under the flight plan has terminated, inactivate the distributed ledger system, and wherein the one or more processors are caused to, once the distributed ledger system is inactivated, receive the data recorded at each node and store the received data in a memory.

33. The system of claim 18, wherein the one or more processors are caused to:
 receive an indication that the received flight plan has been modified;
 determine whether the one or more communication elements of the aviation communications network associated with the received flight plan has changed based on the received indication that the flight plan has been modified; and
 modify the distributed ledger system to include one or new communications elements associated with the changed one or more communication elements.

34. The system of claim 33, wherein the one or more processors are caused to apply a consensus process to the modified distributed ledger system, wherein applying the consensus process comprises transmitting the data previously recorded at each node of the distributed ledger system associated with the originally received flight plan to one or more new communication elements associated with the modified flight plan.

35. A non-transitory computer readable storage medium storing one or more programs for operating a flight plan based distributed ledger system implemented on an aviation communications network, for execution by one or more processors of an electronic device that when executed by the device, cause the device to:
 receive a flight plan, wherein the received flight plan comprises timing, location, and altitude information for a flight that is to fly in one or more coverage areas of an aviation communications network;
 determine one or more communication elements of the aviation communications network associated with the received flight plan;
 operate the determined one or more communication elements of the aviation communications network associated with the received flight plan to communicate with an aircraft, wherein operating the determined one or more communication elements of the aviation communications network associated with the received flight plan to communicate with the aircraft comprises:
  initiate a distributed ledger system on the one or more communication elements determined to be associated with flight plan, wherein the distributed ledger comprises one or more nodes, and wherein initiating the distributed ledger system on the one or more communication elements determined to be associated with the flight plan comprises:
   communicate with an aircraft using the determined one or more communication elements of the aviation communications network associated with the received flight plan during operation of the flight;
   record data associated with one or more communication transmissions occurring between the one or more communications elements during the flight operating under the received flight plan on the distributed ledger system, wherein recording the data on the distributed ledger system comprises recording the data at each node of the distributed ledger system;
  determine when the flight operating under the flight plan has terminated; and
  when it is determined that the flight operating under the flight plan has terminated, transmit the data recorded at each node of the distributed ledger system to a memory for storage.

36. The non-transitory computer readable storage medium of claim 35, wherein determining one or more communication elements of the aviation communications network associated with the received flight plan comprises determining which elements of the aviation communications network will be used to establish a communications link between a ground based operator of the flight and an airborne radio associated with the flight plan during operation of the flight, based on the received flight plan.

37. The non-transitory computer readable storage medium of claim 35, wherein initiating a distributed ledger system on the one or more communication elements determined to be associated with flight plan comprises:
 transmitting the received flight plan to each communication element of the aviation communications network associated with the received flight plan;
 at each communication element of the aviation communications network, applying a cryptographic hash function to the received flight plan; and
 storing an output of the cryptographic hash function in a database located at each communication element of the aviation communications network associated with the received flight plan.

38. The non-transitory computer readable storage medium of claim 37, wherein the transmitted flight plan includes a list of the one or more communication elements associated with the received flight plan.

39. The non-transitory computer readable storage medium of claim 37, wherein initiating a distributed ledger system on the one or more communication elements determined to be associated with flight plan comprises:
 applying a consensus process on the output of the cryptographic hash function stored in each database of each communication element of the one or more communication elements determined to be associated with flight plan;

determining if the output of the cryptographic hash function stored in each database of each communication elements are in agreement with each other; and if it is determined that the output of the cryptographic hash function stored in each database of each communication elements are in agreement with each other, authorizing data to be transmitted between the communication elements to establish a communications link between a ground based operator and an aerial radio associated with an aircraft performing the received flight plan.

40. The non-transitory computer readable storage medium of claim 35, wherein recording data associated with one or more communication transmissions occurring between the one or more communications elements during the flight operating under the received flight plan on the distributed ledger system comprises:

receiving a data transmission at a communications element of the one or more communications elements;

appending a hash value to the received data transmission at the communications element;

adding the received data transmission and the appended hash value to the database of the communications element; and transmit the received data transmission and the appending has value to the other communications elements of the one or more communications elements.

41. The non-transitory computer readable storage medium of claim 40, wherein the hash value appended to the received data transmission at the communications element is based on the direction of transmission of the received data through the communications network.

42. The non-transitory computer readable storage medium of claim 41, wherein the direction of transmission comprises transmissions from the ground based operator to an aerial radio associated with an aircraft performing the received flight plan.

43. The non-transitory computer readable storage medium of claim 41, wherein the direction of transmission comprises transmissions from an aerial radio associated with an aircraft performing the received flight plan to the ground based operator.

44. The non-transitory computer readable storage medium of claim 40, wherein the appended hash value comprises an output of an SHA1 function.

45. The non-transitory computer readable storage medium of claim 44, wherein the appended hash value comprises an output of an MD5 function.

46. The non-transitory computer readable storage medium of claim 45, wherein the SHA1 function output hash value is appended for a first direction of transmission.

47. The non-transitory computer readable storage medium of claim 46, wherein the MD5 function output hash value is appended for a second direction of transmission.

48. The non-transitory computer readable storage medium of claim 40, wherein the one or processors are caused to add the transmitted data transmission to the database of each communications element of the other communications elements that received the transmitted data transmission.

49. The non-transitory computer readable storage medium of claim 35, wherein the one or more processors are caused to, when it is determined that the flight operating under the flight plan has terminated, inactivate the distributed ledger system, and wherein the device is caused to once the distributed ledger system is inactivated, receive the data recorded at each node and storing the received data in a centralized storage repository.

50. The non-transitory computer readable storage medium of claim 35, wherein the device is caused to:

receive an indication that the received flight plan has been modified;

determine whether the one or more communication elements of the aviation communications network associated with the received flight plan has changed based on the received indication that the flight plan has been modified; and modify the distributed ledger system to include one or new communications elements associated with the changed one or more communication elements.

51. The non-transitory computer readable storage medium of claim 50, wherein the device is caused to apply a consensus process to the modified distributed ledger system, wherein applying the consensus process comprises transmitting the data previously recorded at each node of the distributed ledger system associated with the originally received flight plan to one or more new communication elements associated with the modified flight plan.

* * * * *